(12) United States Patent
Blemel

(10) Patent No.: US 7,356,444 B2
(45) Date of Patent: Apr. 8, 2008

(54) EMBEDDED SYSTEM FOR DIAGNOSTICS AND PROGNOSTICS OF CONDUITS

(76) Inventor: Kenneth Gerald Blemel, 6022 Constitution Ave. NE., Albuquerque, NM (US) 87110

( * ) Notice: Subject to any disclaimer, the term of this patent is extended or adjusted under 35 U.S.C. 154(b) by 0 days.

(21) Appl. No.: 11/474,967

(22) Filed: Jun. 26, 2006

(65) Prior Publication Data

US 2007/0021941 A1    Jan. 25, 2007

Related U.S. Application Data

(62) Division of application No. 09/966,397, filed on Sep. 28, 2001, now Pat. No. 7,277,822.

(60) Provisional application No. 60/236,432, filed on Sep. 28, 2000.

(51) Int. Cl.
*G06F 19/00* (2006.01)
*G01B 5/00* (2006.01)

(52) U.S. Cl. .......................... 702/183; 702/34; 702/36; 324/539; 324/544

(58) Field of Classification Search ............ 702/34–36, 702/38–40; 324/539, 541, 544, 551, 557; 73/49.5, 49.6, 592; 340/647; 138/36; 406/34
See application file for complete search history.

(56) References Cited

U.S. PATENT DOCUMENTS

| | | | | |
|---|---|---|---|---|
| 5,333,501 A | * | 8/1994 | Okada et al. ................. 73/592 |
| 5,416,724 A | * | 5/1995 | Savic ........................... 702/51 |
| 6,199,018 B1 | * | 3/2001 | Quist et al. ................... 702/34 |
| 6,389,881 B1 | * | 5/2002 | Yang et al. .............. 73/40.5 A |
| 6,512,444 B1 | * | 1/2003 | Morris et al. ................ 337/401 |
| 6,567,006 B1 | * | 5/2003 | Lander et al. .............. 340/605 |
| 2005/0057259 A1 | * | 3/2005 | Hornsby et al. ............. 324/512 |

* cited by examiner

*Primary Examiner*—Manuel L. Barbee

(57) ABSTRACT

An apparatus providing a means for assessment of the integrity of insulated conduits, harnesses, cables, pipelines and other interconnection systems constructed with integral sensitized media, discrete sensors, and electronics providing a means for transforming sensed data into information and a means for communicating information for the purpose of understanding the location, degree and risk of damage and deterioration, and the probable causes thereof.

1 Claim, 11 Drawing Sheets

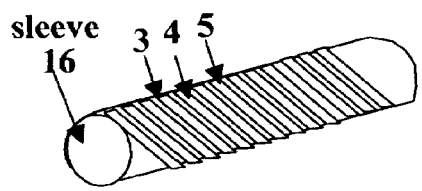
FIG. 2A
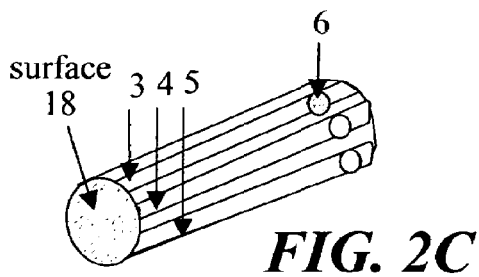
FIG. 2C
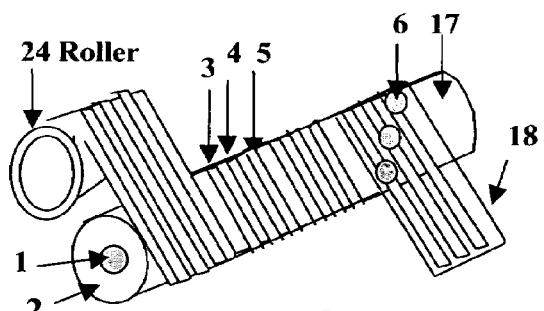
FIG. 2B
FIG. 2
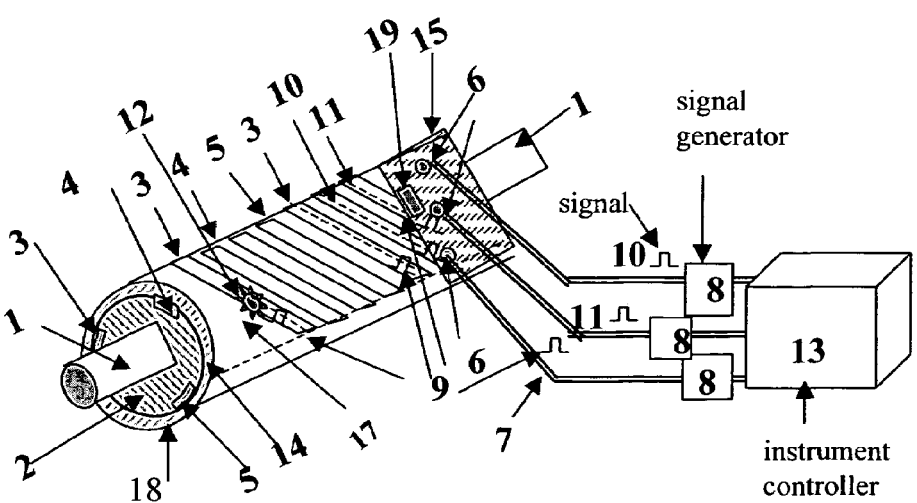
FIG. 3

EMBEDDED SYSTEM FOR DIAGNOSTICS AND PROGNOSTICS OF CONDUITS

CROSS-REFERENCE TO RELATED APPLICATIONS

This is a division of prior U.S. patent application Ser. No. 09/966,397, filed Sep. 28, 2001 now U.S. Pat. No. 7,277, 822, which claims priory from Provisional Patent Application No. 60/236,432, filed Sep. 28, 2000, which is hereby incorporated by reference as if fully set forth herein.

FEDERALLY SPONSORED RESEARCH/GOVERNMENT INTERESTS

This invention was made with Government support under SBIR Contract No. N68335-98-C-0036 awarded by the Naval Air Warfare Center Aircraft Division. The Government has certain rights in the invention.

SEQUENCE LISTING OR PROGRAM

Not Applicable.

FIELD OF THE INVENTION

The present invention relates generally to a system for enhancing safety, reducing failures of systems that carry exclusively or as mixtures electrical, optical, electromagnetic signals, fluids, gases or solids by determining and locating the identity of stress factors (stressors) that cause deterioration and damage affecting the health, status and integrity of conduits and conductive paths, as well as components thereof including cladding, insulating materials, conductors and the signals or media they transport. More particularly it relates to an apparatus with a combination of active and passive components used in-situ for automated inspection periodically or in real time, or during periodic inspection with visual, instruments or automated means to pro-actively identify, measure, diagnose and prognose damage and deterioration as well as the causes thereof.

BACKGROUND OF THE INVENTION

Structures that support transport of diverse electrical and electromagnetic signals, fluids, gases, and solids can be called "conduits". This application uses the term "conduit" for any structure supporting transport that can fail from accumulated damage or deterioration such as a cable, cable bundle, hydraulic or pneumatic hoses, pipes, or fuel lines. Conduits and conduit components deteriorate over time and are frequently damaged due to stress factors called "Stressors" including but not limited to abrasion, vibration, stresses, strains, chemicals, and heat) that exist both without and within conduits. If left undetected and allowed to take its course, the damage caused by stressors can cause damage of said components grounding, shorting, leaks of substances carried in the conduits. The damage can occur in moments or take an extended period of time. Often the failure happens unexpectedly, before a system's operator knows of the problem.

In practice, conduits are usually encased by an insulating material and sometimes sheathed with one or more layers of cladding to assure continued functionality and safety. In certain situations it is important to know the degree of risk and status of health and integrity of conduits, contained conductors, and related components that comprise them.

Conduits and systems of conduits may carry electrical power, fuel, other fluids, pneumatics, optical or electromagnetic signals. Deterioration and damage to cladding and insulation can be, and often is, a precursor to a failure in a system. Damages to interconnection systems includes, but are not limited to, chafing due to vibration, corrosion due to caustic chemicals, incisions, due to sharp edges, stress and strain due to motion, burning, oxidation, reduction and other chemical reactions, as well as chemical and physical degradation due to aging.

We focus now on aircraft wiring as conduits, although the following statements have broad application in other uses for conduits of other types in other applications. In older fly-by-cable aircraft, chafed, cut electrical harnesses, control cables and hydraulic conduits used to control flight surfaces, landing gear, fuel supplies and engines have been known to cause loss of control of the aircraft and fatal crashes as in the American Airlines DC-10 crash at O'Hare Airport on May 25, 1979, in the report of the National Transportation Safety Board, a non patent document cited as reference #1. In current fly-by-electric aircraft damaged electrical wiring with exposed conductors are known to result in electrical shorts resulting in numerous instances of fire, crashes and fatality. For example, damage to or deterioration of electrical conduits has been implicated as root cause of failure in a report by the Canadian Civil Aviation Authority as a probable cause the Swissair flight 111 MD-80, a non patent document cited as reference #2. Deterioration of electrical wiring is cited as a probable cause of the explosion in the center fuel tank of TWA Flight 800 Boeing 747 in the report of the National Transportation Safety Board, a non patent document cited as reference #3. A similar situation exists with fiber optic conduits being used in emerging fly-by-light aircraft control systems.

Severe chafing can cause exposure or damage to the conduit or that which is causing the chafe. In either case the results can be catastrophic as witnessed by the report of the NTSB investigation of the crash of a V-22 aircraft in 2000, a non patent document cited as reference #4. In this instance the cause of the crash was attributed to chafing by electrical conduits resulting in chafe through of a titanium hydraulic conduit releasing its contents.

By law, or decision in recognition of sufficient risk, conduits are usually required to have reactive safety devices such as electrical circuit breakers, temperature and pressure sensors, and relief valves as the means to protect against hazards. In many cases visual and intrusive inspections are used to assure functionality and safety. However, recent studies of intrusive inspections indicate that the procedures can do more harm than good by disturbing and damaging otherwise healthy materials. A recent investigation and report released in June 2001 by the US Federal Aviation Administration Aging Transport Systems Rulemaking Advisory Committee published in 2000, a non patent document cited as reference #5, found that careless intrusive inspections can be a significant risk of causing damage to aircraft wiring.

Damage to aircraft conduits is known to cause catastrophic failure due to loss of signals to control systems, loss of hydraulic fluid, and other situations. Even when control systems remain intact toxic fumes, and dense toxic smoke from smoldering or fire can make it impossible for a pilot to safely fly the aircraft. Intense heat from burning aromatic polyimide electrical wiring insulation and other combustibles can melt other insulation in seconds leading to collateral damage, more shorts and further loss of control. As a result commercial aircraft are now required to have smoke detector alarms. Soon they are expected to incorporate apparatus disclosed in patents by Haun et al U.S. Pat. No. 6,259,996 and Fleege et al U.S. Pat. No. 6,242,993 called arc fault circuit breakers that act to interrupt in real time on detection of arcing electrical faults, but it may be too late to avert disaster.

Considering the extreme safety hazards of loss of control, toxic fumes, toxic smoke, fires or fuel tank explosions of aircraft it is not only important to know that deterioration or damage such chafing, arcing, or cut wires has occurred but also that a situation exists that likely will cause it to happen during flight. It would be very desirable therefore to have an advance warning or corrective action initiated by an in-line or in-situ passive means for the purpose of detecting evidence of significant causes of deterioration, damage and failure of conduits as well as the degree of ongoing deterioration and damage. It would be even more desirable if electricity was not the means of detection of said ongoing deterioration and damage.

A patent disclosure for a device for the said purposes was not evidenced during our year 2001 searches of patent databases.

DISCUSSION OF PRIOR ART

Our search of patent databases discovered over one hundred patents that deal with detection of faults in electrical signals, detection of damage and deterioration in electrical conductors and likewise in electrical insulation, along with patents of similar nature applied to deterioration and damage of pipelines, fiber optic networks and other conduits.

DISCUSSION OF LIMITATIONS OF PRIOR ART

The following discussion presents limitations of prior art, or those aspects not covered by prior art that are addressed by the present invention. For brevity, only the most significant limitations of each category of prior art are included.

Currently nothing is in wide use that combines detection of stressors, detection and diagnosis of damage to a conduit in progress, and prognosis of risk of conduit failure and system failure. The disclosure of U.S. Pat. No. 4,988,949 by Boenning et al is limited to detecting mechanical damage (chafing) on electrical cables against grounded structures under constant monitoring. The disclosure of U.S. Pat. No. 6,265,880 by Born et al discloses use of a length of electrical conducting media (such as a wire) along the outside of a conduit to detect mechanical damage (chafing), and improves on said Boenning's patent by teaching periodic testing, and detecting chafing on conduits other than electrical cables, and detecting chafing against a non-electrically grounded structure.

Watkins patent U.S. Pat. No. 5,862,030 teaches an electrical safety device comprised of a sensor strip disposed in the insulation of a wire or in the insulation of a sheath enclosing a bundle of electrical conductors, where the sensor strip comprises a distributed conductive over-temperature sensing portion comprising an electrically conductive polymer having a positive temperature coefficient of resistivity which increases with temperature sufficient to result in a switching temperature. Said Watkins' patent also teaches use of electricity with a mechanical damage (chafing) sensing portion comprised of a strip disposed in the sheath in a mechanical damage sensing pattern which like said Born's patent becomes damaged or open upon mechanical damage of the sheath before the bundle of conductors are damaged. Watkin's patent does not teach a means to perform detection of mechanical damage without use of an electrically conductive sensor material.

Currently nothing is in wide use to detect, measure and diagnose onset of damage by simultaneous stressors. Currently nothing is in wide use detect and diagnose damage to conduits with mixed conductors such as electrical power, electrical signal, and optical signal conductors in a single bundle. Use of uncontained electrical signals is often dangerous and hazardous especially when conduits carry flammable or explosive matter, yet currently nothing is in wide use that enables detection of chafing or other damage by non-electrical means. Currently nothing is in wide use that diagnoses the likely stressor, or estimates the likely risk and progress of damage and future damage, or predicts the remaining useful life of a conduit. Currently nothing is in wide use that operates in-situ, on or in the conduit, in a timely fashion to warn and possibly pre-empt catastrophic damage that would otherwise occur.

Thus there exists a need for a system to detect and identify multiple types of stressors, to quickly measure and interpret multiple types of damage including but not limited to mechanical damage (chafing), all prior to any damage to the internal structure of a conduit or to systems in the vicinity of the conduit. Further there exists a need for a method to combine and fuse information of type and amount of damage with identity of stressors and rate of damage to estimate in a timely fashion the risks of future damage. Further there exists a need for a means to mark multiple points of damage to aid in repair and remediation.

Prior art disclose techniques with real time signal processing to detect intermittent arcing to ground, series arcs and parallel arcs in electrical wiring due to brief wiring shorts. Fleege et al, U.S. Pat. No. 6,242,993 and Haun et al U.S. Pat. No. 6,246,556 use an electrical circuit and signal processing algorithms as part of an "arc fault detecting electrical circuit breaker" to identify arcing faults but cannot locate the place where the arc fault occur. Baldwin et al U.S. Pat. No. 6,249,230 discloses a ground fault detection system and ground fault detector to identify, but not locate the place of, ground faults. These patents dealing with arc and ground faults have limitation because they do not assist detection before the problem occurs and does not assist repairmen in locating the place of where the problem occurs in order to correct the situation and any damage caused. The present invention overcomes limitations of the said arc and ground fault circuit breakers for three reasons. First, the present invention detects conditions prior to when faults occur. Second, the present invention does not require signal processing algorithms, signal digitizer or signal processor to accomplish detecting intermittent faults by using sensed evidence of damage to the sensitized strands at the point of the fault. Third, the location of the intermittent fault can be determined by the marking or by other means such as reflectometry on a damaged strand capable of supporting electromagnetic waves, or measurement of the amount of light contained in the damaged strand of a fluorescent-doped fiber compared to previously measured level of light in the fiber before damage.

For short exposed distances, some emerging methods and apparatus provide inspection with automated measuring instruments employing means such as digital processing of images made with ionizing radiation, ultrasound, heat, and radar presented at the 2000 Aging Aircraft Symposium in St. Louis Mo. referenced as non-patent document #6. Such methods have limitations due to the subjective nature of reading the images, distance from the conduit, and masking caused by structural members and clamps attached to conduits. Such methods require removing such impediments, focusing on and changing proximity to the impediments, or other intrusive means, and this action can lead to damage where none existed before. More importantly the procedure to detect tiny yet important damage in images other than made by x-ray is invasive requiring rotation to obtain 360-degree inspection. When the size of the conductors are smaller than 16 gage such invasive practice is well known to cause damage by twisting and disturbing the conduits, especially when the conduits are embrittled with age. The present invention overcomes said limitations by operating at the surface of the conduit, providing direct evidence.

It is a limitation when prior art such as Hiller U.S. Pat. No. 5,218,307 and Miskimins U.S. Pat. No. 6,230,109 that require manual intervention when inspecting electrical and conduits of hazardous materials for defects and failures. The present invention overcomes this limitation by being laid on or in the conduit before damage occurs and has built in interface to automated remote inspection techniques such as reflectometry, wireless couplings and end-to-end tests.

The current invention is a system using a method for determining the health status of conduit components, conduit sections, and systems that utilize conduits. Briefly stated, the method is comprised of the steps of: determining the requirements for monitoring the system of conduits; defining the functions of the distributed computers, diagnostic and prognostic software to meet the requirements; selecting the parameters to be sensed and monitored; selecting the components consisting of electronics, hardware, software, firmware and set of discrete sensors and strips of sensitized medium to implement the functions; designing and manufacturing the form and fit of the monitoring device comprised of said components; applying, placing, attaching or embedding the monitoring apparatus in a conduit; and placing the discrete sensors and strands of sensitized medium along the length of said conduit. The purpose of the discrete sensors is to measure characteristic parameters of the conduits and stress causing factors. The said strands of sensitized medium, each having a first end and a second end, being placed such that damage inducing factors such as an a solid object, gas, liquid, powder or electromagnetic waves contacts said medium prior to contacting said conduit. The combination of discrete sensors and strands of sensitized medium provide a means for determining by a combination of measurement and deductive algorithms whether, when and where and to what extent said damage inducing factors have damaged each of said multiplicity of sensitized medium. Algorithms of a monitoring application use the said determinations along with other a-priori data to infer damage or pending damage to conduit components, conduit sections, and systems of conduits.

OBJECTS AND ADVANTAGES

This invention has the objective to enhance the safety, performance, reliability and longevity of systems that utilize conduits by sensing causes of damage and evidence of deterioration of components. Conduits in this context include, but are not limited to, electrical conductors, optical conductors, harnesses assembled from a multiplicity of combinations of electrical or optical conductors, pipelines for transporting liquids and gases, hydraulic and fuel lines, heating cores and tapes, aqueducts and sewers. Components of said conduits in this context include, but are no means limited to, the supports, cladding, insulation, junctions, electronics and conductors that embody said conduit and the media transported by the conduit. Causes in this context include, but are not limited to, chemicals, mechanical stress, erosion, corrosion, radiation, wetness, oxidation, reduction, electricity, contaminants, the media transported, processes used in manufacturing and installation, and actions of persons that install, inspect, repair and maintain the said conduits.

Therefore, one object of the present invention is to combine detection of onset of damage by a wide variety of stressors, and perform diagnosis and prognosis of damage to a conduit before damage to the conduit occurs.

Another object is to provide a method to deduct the identity of active stressors.

Another object is to provide a means to locate places where damage has occurred and coincidentally locate a place on the stressor as well.

Another object is to provide a means to diagnose damage, to predict future damage, and to prognose risk of conduit failure and system failure.

Another object is to provide a means to sense and locate damage that does not depend on electricity to excite sensor material or read the sensor.

A final object is to provide a means and method that operates on or in the conduit, in a timely fashion to warn of damage in progress and possibly pre-empt catastrophic damage that would otherwise occur.

Accordingly, besides the objects and advantages described above paragraphs several objects and advantages of the present invention are:

(a) to provide a system for unattended surveillance and real time inspection of conduits;

(b) to provide a system to identify the probable cause and estimate the location of the points of damage so as to facilitate remedial action;

(c) to provide a system to be pro-active by enabling and providing for early detection, identification, and location of external and internal stressors that left unattended will lead to damage of components of the conduit disrupting the system the conduit services.

Patent searches in preparation of this application have not found prior art that provides a means for enabling real time automated probabilistic identification of the cause. Said searches also have not found prior art that provides a means for automatically and in real time marking of surface at points damage as a means for assisting in remediation and repair thereof. Said searches have not found prior art that utilize combinations of coated, hollow, filled, doped fibers and otherwise sensitized strands as a means for detecting and identifying stressors or detecting and locating damage to the conduit insulation and by implication the conductor therein.

There is an important and significant advantage in using data from measurements of characteristic parameters of strands of sensitized medium, and in particular strands that detect damage without the use of electrical excitation or interrogation. Individually, the purpose of the sensitized strands constructed in the manner of the present invention detect and provide data on damage and conditions that could lead to damage, such as ingress of fluids.

There is an important and significant advantage in having a way to mark points of damage to the strands by the stressors, especially as an aid to repair persons and inspectors. Having a marker dye in the core of each strand, or a marker substance that disperses on damage will release a mark at the location of chafe, laceration, flame or melting heat. Reflectometry and other measurement methods would also locate the place of corrosion, oxidizing due to heat and chafing, etc.

There are important and significant advantages to employing the invention such as the ability to determine that damage to the sensitized media is taking place that infers or current damage to the insulation and eventually damage to the conducting core. In the case of electrical conduits, or conduits of dangerous chemicals, such damage detected early could mean the difference between life and death. As a minimum the invention has the advantage to implement condition based maintenance which is a procedure of choice in maintaining important systems such as pipelines, conduits, electrical systems, communication systems, data systems and other uses of conduits. In any event, there is the advantage of having the ability to accurately detect, locate and infer the presence of the damaging stressors that will be of use to the inspector or repair person. This will be of particular advantage to inspectors and maintainers when the system of conduits is not easily inspected, perhaps hidden inside a wall, buried underground, in space systems, aircraft and undersea. The advantages are not limited to situations involving the conductive core and extend to the insulation material and other protection devices. An example of such an advantage is found in aircraft wiring systems where insulation is made from aromatic polyimide called Kapton which is known to explode and cause fires when the insulation degrades over time to form carbide molecules which release flammable acetylene gas when wet.

The significant advantages of the present invention are achieved by use of a microcontroller and signal generators connected to a pattern of a multiplicity of dielectric or otherwise insulated strands each filled, coated, clad or doped with at least one substance specific to a class of stressors so that when said strands are added to or are overlaid onto conduits overcome shortcomings in the prior art. The advantages are achieved by placing said pattern of strands along and around the surface of the conduit. The following list other significant advantages over sundry prior art.

It is an advantage that the present invention can be used without disconnecting the conduit it inspects.

It is an advantage that the present invention can be implemented with an integral microcontroller for real time in-situ sensitized medium and sensor management, data processing, and communications It is an advantage of the present invention that it can be embodied in a manner using optically transparent fibers inspected by beams of light, whether collimated or not collimated, eliminating the need for electricity or electrification as a means of test.

It is an advantage of the present invention that it can be so constructed in other embodiments without a microcontroller and signal generators in a manner that facilitates attachment of the microcontroller or other suitable processor, signal generators and ancillary electronics during manual inspections without disassembly of the conduit.

It is an advantage of the present invention that it provides a means to locate points of stress damage by incorporating at least one strand filled or coated with a marking material.

It is an advantage of the present invention that it can be configured within the surface of a conduit or it can be placed on or can be sleeved over the conduit surfaces. The present invention thus enhances and protects the existing insulating and protecting material while providing enhancements to current visual inspection techniques and also to inspection using non-visual measurement systems during operations, inspections, tests, and repairs. When embodied in or added to an interconnection system, system of conduits or pipeline, the invention provides a means for ready and accurate determination of the presence, cause, location, degree of stress and degree of damage by a variety of commercially available fibers, measurement devices and instruments.

The present invention has the advantage to provide inspectors with a means to remotely locate and measure stressors and assess damage by stressors in accessible and inaccessible areas.

The present invention has the ability to detect onset of damage to the insulator and its protective coating, if any. This is a definite advantage over finding after the fact an electrical fault in the conduit.

It is an advantage of the present invention that safety risks are avoided because the present invention enables use of light, sound, microwaves, pressure and other non-electrical means to sense, locate and determine causes of damage avoiding the safety risks inherent in using electricity.

SUMMARY OF THE INVENTION

Briefly stated, the present invention is a system that provides a mechanism and a method to detect multiple forms of damage to a conduit and perform diagnosis, prognosis related to condition and remaining useful life of said conduit, thereby reducing the chance of failure of any system that would be damaged or whose function would be impaired by damage to the conduit. Such a system could carry electrical power, optical or electromechanical signals, fuel or other fluids, may be hydraulic or pneumatic, or may carry solids such as particles.

The present invention is a system that is constructed with a microcontroller or other computer connected optically or electrically or mechanically to a combination of a set of discrete sensors and a multiplicity of strands of sensitized media placed on, into, or woven as a sheath substantially surrounding a conduit and that when attached to, sleeved over, or embedded into said conduit provides a means whereby to collect data to detect, locate, and reason the existence, cause and degree of stress or damage to the sensitized medium themselves and by programs and algorithms in the microcontroller or other computer to sense, detect, locate and reason risk of damage of the conduit.

Throughout this application the term strands mean elongated forms of substances such as strips, fibers, tubes, filaments of diverse materials and dimensions with excitable strands in this context are those strands that can carry signals. Non-excitable strands in this context are strands that are not intended or not conditioned to carry signals and serve another purpose like a marker strand and said strands can be entirely selected of optical, electrically opaque medium sensitized with coatings, claddings, and non-metallic materials so as to eliminate any possibility of electrification of the strands.

Damage caused by external stressors including, but not limited to, corrosive chemicals, heat, structures, and maintenance actions is detected by wrapping the conduit with a set of strands of sensitized medium such as treated, clad, or coated hollow or solid fibers. The sensing elements are positioned so that damage caused by a stressor breaks, erodes, corrodes, punctures or breaks one or more of the sensing elements. Measuring the end to end integrity of still measurable sensing elements or performing other tests on them determines whether each has failed, thereby indicating that the conduit's integrity will be compromised unless remedial action is taken.

According to one embodiment of the invention, a method for detecting damage of a conduit comprises steps of placing adjacent the conduit surface an effective length of a pattern of sensitized medium being located so that a stressor cannot damage the conduit without substantially damaging a strand of sensitized medium; determining and storing characteristics of the installed apparatus; performing measurements during operation in a periodic or continuous fashion on the sensitized medium; analyzing the measurements; comparing the measurements against the stored characteristic measurements; determining damage by examining the integrity of the sensitized medium or other processing; deducing the likely identity of the stressors; diagnosing the meaning of the damage with respect to the conduit; predicting the degree and intensity of the expected damage to the conduit, prognosing the remaining useful life of the conduit without remediation; updating the algorithms and parameters; taking any programmed actions such as if isolating damaged stressors, sensitized medium; and as programmed messaging the status of damage, integrity and remaining useful life for awareness by the operators of the system.

In its current status of development, the technology of the present invention is being first manufactured for aircraft wiring systems with flight-testing in 2002. A major advantage of the present invention is that it has a three-tier hierarchy of a central processor linked to local processors called sector managers and processors in the apparatus attached to the conduits. This hierarchy is implemented utilizing advanced artificial intelligence algorithms for pattern recognition, machine learning and other techniques to use probability and statistics for highly accurate diagnostics and prognostics. The current implementation incorporates mechanisms and algorithms for artificial intelligence to learn causal factors, and learn the effects of damage from experience dealing with past instances of damage and repair.

BRIEF DESCRIPTION OF DRAWINGS

The novel aspects of this invention are set forth with particularity in the appended claims. The invention itself, together with further objects and advantages thereof may be more readily comprehended by reference to the following detailed description of presently preferred embodiments of the invention, taken in conjunction with the accompanying drawings.

FIG. 1A shows diagrammatically the concept of undamaged strands embodied in the manner of the present invention. The figure shows by example one glass strand, one strand coated with noble metal, one strand coated with a base metal and one strand with a core that is made of a substance that fluoresces in ultraviolet light. Again, these sensitized media will be individually selected based on the specific application and operational environment of the conduit. The four medium used throughout FIG. 1A through 1E are for example only.

FIG. 1B shows diagrammatically the damage to the sensitized strands caused by a substance that is less hard than glass, because the glass is unaffected, but harder than the base metal, noble metal and substance of the marker strand. The affected marker strand indicates the location of the damage by the debris at the location of damage which is very near the damage to the others.

FIG. 1C shows diagrammatically the damage across all four strands, which indicates that the damage likely caused by incision or slicing by a substance harder than glass. Again, the change evidenced by the affected marker strand indicates the location of the damage.

FIG. 1D shows damage to the marking indicator strand only, which indicates the damage is likely caused by certain solvents that are not strong enough to affect the base metals, noble metals or glass but do dissolve the coating of the said marker strand. Collateral information about the composition of said marker strand would provide even more understanding of the cause of damage.

FIG. 1E shows damage to only the base metal, indicating that the stressor is probably a corrosive because no other strand was affected and the noble metal is intact. The marker strand is unaffected, however a marker substance could have been included in the composition of the base metal, or if a hollow strand filled with marker dye were utilized, a mark would be released.

FIG. 2A is a diagrammatic view of the pattern of strands of sensitized media formed on or in a sleeve or tube that can be slid in place over the insulated conduit or bundle of insulated conduits in accordance with this invention. The said sleeve or tube could be slit on the diagonal between any two strands of sensitized media can be easily wrapped around a conduit.

FIG. 2B is a diagrammatic view of the pattern of strands of sensitized media formed, embossed, or otherwise placed in largely parallel fashion on a tape that is wrapped onto the insulated conduit or bundle of insulated conduits in accordance with this invention. Three points of attachment are shown along the insulation, and conductor;

FIG. 2C is a diagrammatic view of the pattern of strands of sensitized media embossed, extruded, or otherwise placed in a co-linear fashion onto the insulation protecting a conduit in accordance with this invention. This could be split horizontally between any two sensitized to be easily wrapped around a conduit;

FIG. 3 is a diagrammatic view of a coupling assembly containing a microcontroller with signal generators connected to discrete sensors and to strands of a pattern of sensitized media attached at points to the coupling for the purpose of detecting, locating, and determining the cause, extent and location of damage. The figure assumes a self-contained power source or attachment of the microcontroller to a power conductor.

Each figure is diagrammatic to the extent that the inner insulated core [1], insulation protecting the core [2] and sensitized media [3], [4] and [5] are shown as each having no particular material, essentially no thickness, no particular separation distance between materials, and no particular predefined pattern. However, the material, thickness of the said sensitized media and pattern can be selected to provide calibration of the degree of ingress of the damage. For example, a thicker aluminum or corrodible metallic element will withstand more corrosion than a thinner element of the same width and material. For example, a tight pattern of millimeter size elements will reduce chance for not detecting millimeter size damage. FIG. 2B, FIG. 2C, FIG. 3, FIG. 5 and FIG. 6 have diagrammatic points [6] for attaching connections [7] from the signal generators [8] to the coupling [15] is not representative of any particular configuration. Each figure is also diagrammatic with respect to other symbols that represent test signals [9] [10] [11], damage [12] and microcontroller [13]. The supporting surfaces [16] [17] have no particular description except as to be not causing cross-talk or other confounding situations. The discrete sensors [19] have no particular sensory capability other than being suitable for use with the microcontroller [13]. Similarly, the debris or leakage [14] has no particular attribute other than having at least one property useful in locating points of damage [12]. The types of sensitized strands [20] [21] [22][23] are only representative of those compatible with single-ended measurements. Finally the symbol used for a spool [24] is only for illustrative of a means to apply strands on a supporting medium.

Reference Numerals in Drawings

Figure 1:
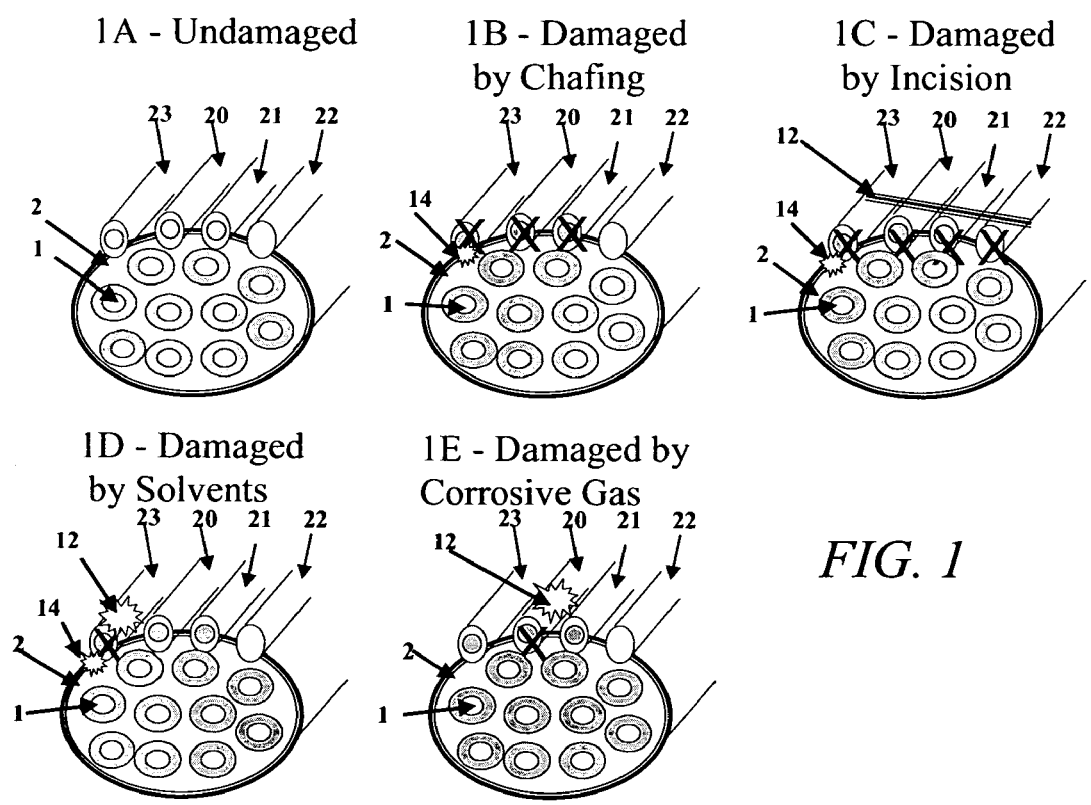
FIG. 1 is a diagrammatic view of the technique of the invention and shows how damage to one or more strands of sensitized media employed according to the invention provide the basis not only for accurately locating the place of damage but also provides evidence for reasoning the probable cause of damage. This can be extended by selecting sensitized media constructed in accordance with the invention that are individually or severally affected by stressors. In practice the sensitized media will be individually selected based on the specific application and operation environment of the conduit.

[1] core conduit to be protected from damage
[2] insulation protecting the core [1]
[3] sensitized media 1
[4] sensitized media 2
[6] point of attachment
[7] interconnections
[8] signal generator
[9] signal applied to sensitized media 1
[10] signal applied to sensitized media 2
[11] signal applied to sensitized media 3
[12] damage
[13] microcontroller
[14] debris or leakage
[15] coupling
[16] surface of sleeve supporting sensitized media -continued Reference Numerals in Drawings

[17] surface
[18] supporting surface
[19] discrete sensors
[20] strand with core doped with florescent chemical and plated with base metal
[21] strand, with core doped with florescent chemical and plated with noble metal
[22] strand of solid glass
[23] marker strand
[24] spool
[25] the monitoring applications
[26] data from first tests
[27] baseline characteristics
[28] set of causal models
[29] set of analysis algorithms
[30] set of control algorithms
[31] data from monitoring
[32] determine requirements
[33] define the diagnostic and prognostic functions
[34] select the characteristics to be sensed and monitored
[35] define the appropriate architecture
[36] select a set of discrete sensors and sensitized medium
[37] construct the monitoring devices
[38] develop models
[39] develop the monitoring applications
[40] install the apparatus
[41] perform first test sequence
[42] monitoring
[43] diagnose health states
[44] prognosis
[45] communicating data and knowledge
[46] machine learning
[47] improving models
[48] conduct first test sequence of sensors and sensitized strands
[49] conduct first test sequence of the system of conduits
[50] develop the algorithms
[51] develop control software
[52] integration and testing
[53] initialize for tests
[54] increment the discrete sensor counter
[55] measure discrete sensor data
[56] determine sensor change
[57] choose to repeat sensor test
[58] if last discrete sensor
[59] fuse set of discrete sensor data tuples
[60] increment the strand counter
[61] measure sensitized strand data
[62] determine strand change
[63] choose to repeat strand test
[64] if last strand
[65] fuse set of strand data tuples
[66] record sets of sensor and strand data tuples
[67] generate weighting parameters
[68] data fusion
[69] diagnose health states of sensors and strands
[70] diagnose health states of conduit components
[71] diagnose health states of conduit sections
[72] diagnose health states of system of conduits
[73] decide to locate damage
[74] locate damage
[75] predict damage states
[76] predict effects
[77] predict health states
[78] predict remedial actions
[79] perform inference
[80] compute causal relationships
[81] update causal models
[82] compute new parameter statistics
[83] update model parameters
[84] update the monitoring applications
[85] record data
[86] select a-priori information
[87] process new characteristic information
[88] determine any change from prior characteristics
[89] record characteristics
[90] choose to measure location
[91] measure the location of the change -continued

| Reference Numerals in Drawings |  |
| --- | --- |
| [92] | estimate degree of damage |
| [93] | record health state information |

DETAILED DESCRIPTION

In order to achieve the objectives of the above mentioned, the present invention provides as system made up of a method and an apparatus, the apparatus comprising:

- a multiplicity of heterogeneous discrete strands of material, each naturally sensitive, or specifically made to be sensitive to stressors or the damage caused thereby by coating, cladding, or doping or other means with at least one media substance specific to a class of anticipated stressor or anticipated damage caused by stressors; and,
- a dielectric substrate, braided matrix, mesh, substance or surface on which to form, overlay, weave, or attach said strands in a measurable pattern; and,
- at least one electronic processing device of type called a microcontroller, or an interface to another suitable processor with ability to digitize, process, and perform prestored algorithms of calculus and logic, interface with microsensors and the said strands; and,
- a multiplicity of sensors for the purpose of collection of data on diverse variables anticipated in the domain of the conduit; and,
- a multiplicity of signal generators, or a multiplexed signal generator at least sufficient for the purpose of exciting the number of strands that are able be excited to obtain data on health, status, condition, and damage to the said strands.

Signal generators in this context are electronic, pneumatic, optical, audio or other signals needed to extract data from excitable strands.

Discrete sensors in this context devices that serve a purpose to provide data on environmental, internal, physics, etc. and may be located at a distance communicating by wired or wireless means to the microcontrollers.

The said multiplicity of heterogeneous sensitized strands, heterogeneous discrete sensors and microcontrollers serve as a means for sensing, detecting, locating, measuring and messaging in real time about deterioration and damage to sensitized medium, conduits and threats thereto.

In accordance with the present invention the strands of sensitized medium are sensitized so as to provide a means to detect and differentiate causes of damage to a conduit and components thereof or damage occurring in the conduit due to internal factors.

According to conventional design practices, the microcontroller can be constructed in an electrically isolated package and interfaced to only optically conductive sensitized strands using optical decoupling such that light rather than electricity is used to extract data from the strands.

The system of the present invention provides a means to obtain, store and learn from data; the means to learn and fuse data to probabilistically assess causal factors of damage; the means to quantify the state of deterioration and damage that has occurred; the means to assess the risk that a situation exists that likely will soon cause deterioration or damage to happen; and the means to formulate and communicate messages about the state of deterioration, damage, risks of damage and causal factors.

In accordance with the present invention the apparatus is constructed as a layer, sleeve or tape made a multiplicity of said strands of media coated, doped, and otherwise sensitized to anticipated conditions within and external to said conduits, then adding the constructed apparatus as an applique, sheathing, weaving or winding to the outer or inner surface of the conduit.

In accordance with the present invention ancillary electronics that are not an integral part of the apparatus such as personal computers, signal conditioners, used for instruments not included in the apparatus should be selected so as to be able to be readily interfaced to the apparatus.

In accordance with the present invention, the microcontroller and other electronics should be packaged with foresight to prevent damage to itself or other entities.

In accordance with the present invention the substrate, mesh, or surface on which to form, overlay, or attach the strands is selected of suitably inert insulating material.

In accordance with the present invention, when used in communication with a commercially available computer, the data, causal inferences, probabilities and messages generated by the present invention can be used to probabilistically predict future local, system and end effects of faults and failures as well as remedial actions.

In accordance with the present invention, the sensitized medium can be made up of piecewise pieces of heterogeneous medium placed layered, side-by-side or end-to-end; each piece, when stimulated, either emitting optical phenomena, or exciting optical phenomena of the sensor or releasing optical phenomena from the sensor; and could be of any size with respect to said supporting surface. Further, the individual patterns can be electrically conductive as long as they do not introduce unintended side effects or electrical conductivity end-to-end for the length of the sensor.

PREFERRED EMBODIMENT

The preferred embodiment involves using the method by installing a monitoring apparatus with a computer, microcontroller or other processor for performing algorithms, the apparatus constructed by connecting a battery, power scavenging capacitor, solar cell array, or other suitable source of power, a wireless commercially available microcontroller such as a Sentient™ microcontroller, which in turn is connected to a multiplicity of selected commercially available discrete sensors, and a multiplicity of commercially available sensitized strands coated, doped, or clad with specific sensor properties affixed in a largely parallel pattern on a suitable insulating substrate such as a fluoropolymer like EFTE, EFTE-CTFE, FEP, and PFA or mylar or polyimide. The apparatus is either directly attached to a conduit, woven in an insulated mesh, or woven among conductor strands or on an insulating substrate that is subsequently affixed to a conductor or conduit. In service the preferred embodiment is linked by wire or wirelessly to a remote computer such as a commercially available palm, laptop, or desktop model.

The said microcontroller provides the means to collect and process data obtained from the said strands and from said discrete sensors with algorithms to detect and probabilistically determine extent of damage as well as predict future damage and the progression of effects of failures on the system served by the conduit.

The said discrete sensors provide the means to sense local configuration, usage, threat and environmental data. Types of said discrete sensors include, but are not limited to, devices for measuring humidity and temperature and other evidence such as odors from combustion byproducts. The said discrete sensors provide the means to detect deterioration and damage as well as detect factors that would affect the conduit and the service it provides.

The said multiplicity of strands are selected for each application primarily as a means to provide data about deterioration, damage, or causal factors; and secondarily to provide a means to indicate places where deterioration, damage or threat of damage exists. In a preferred embodiment, all fibers must be nearly of the same diameter, and the strands would be laid out in a measurable pattern that surrounds the conduit such as those shown in the FIG. 1, FIG. 2, FIG. 3, FIG. 5 and FIG. 6. Ideally the pattern strands around the conduit should repeat their pattern in a space of less than one centimeter.

The said multiplicity of strands of sensitized medium, being placed such that damage inducing factors such as an a solid object, gas, liquid, powder or electromagnetic waves contacts said medium prior to contacting said conduit, provide data for determining by a combination of measurement by signal processing and deductive algorithms whether, when and where and to what extent said damage inducing factors have damaged each of said multiplicity of said strands.

The said remote computer is selected for the ability to communicate with the said microcontroller or perhaps indirectly with a system computer that communicates with the said microcontroller by wired or wireless means. Collectively, data from the microcontroller is the means to use artificial intelligence algorithms to make an probabilistic identification of the causes of stress; predict the type of damage being wrought; estimate the degree of damage incurred; estimate the remaining useful life before failure occurs to the conduit. The remote computer provides the means to communicate in real or elapsed time to persons who are at risk, who provide maintenance services, or who otherwise need to be aware of deterioration, damage, or risk thereof to the conduit and the services it provides.

In the preferred embodiment, the said pattern of a multiplicity of strands is connected with the said microcontroller at least at one end. Situations may arise when a microcontroller is required at another end of the conduit. This can be readily accomplished with a wireless, light emitting, or wired commercial technology such as BlueTooth™ In the preferred embodiment the discrete sensors will be placed for maximum effectiveness and if necessary the sensors could be connected to a commercial wireless technology like BlueTooth™ to enable performing functions such as sensing for end-to-end continuity tests.

Referring now to FIG. 1, which shows a diagrammatic view of how damage to one or more sensitized media provides evidence for determining the cause of damage. For illustration, the sensitized media in FIG. 1 comprise a strand of translucent fiber doped with a substance that fluoresces when exposed to ultraviolet light, coated with an opaque piezoelectric material [23]; a strand of optically transparent fiber coated with base metal (e.g. aluminum) [20]; a strand of optically transparent fiber coated with a noble metal (e.g. gold) [21]; and a strand of silica fiber coated with a fluorescent polyimide buffer [22]. The four media [20-23] used throughout FIG. 1 are for example only. The five sub-diagrams in FIG. 1 show how evidence from damage to the sensitized media is readily combined to infer the probable cause of damage. Logic combining the temporal order of damage indicated in a test and type of the conductive elements affected with damage can be used to assess the type, degree, and speed of ingress of damage. For example, discontinuity to one material caused by hydraulic fluid would not affect a metallic surface; and damage due to acid corrosion of a metallic surface would not affect a sensitized media made with a noble metal, a plastic or a polymer. This evidence can be processed with artificial intelligence algorithms such as a Neural Network, Bayesian Belief Network or Boolean Logic truth-table to derive the probable causal factors.

Referring now to FIG. 2A, which shows a pattern of heterogeneous sensitized media [3] [4] [5] laid linearly in parallel fashion as helices with as small a pitch between media as possible, formed on the outer or inner surface [16]. The surface could be a sleeve or tube made of suitable dielectric or other material suitable for the purpose of separating the sensitized strands. The said pattern of sensitized media could be on the exterior, the interior, or formed as a matrix with the inter-spatial material to form a sleeve or tube. A plurality of sensitized media can be placed on both upper and lower surfaces. The calculation of distance by the sensor instrument algorithm can be used to discern which side or edge of the ribbonized conduits is being damaged. The pattern of sensitized media [3] [4] [5] can be formed on a sleeve [16] so as to enclose a single conduit or a bundle of conduits. If the sleeve [16] is made of shrinkable material it can be slipped and shrunk over the insulation or itself be made of an insulation. The pattern of sensitized media [3] [4] [5] can be of diverse materials such as optical strands, metal strands, or organic strands formulated to sense or to act as waveguides or transmission lines. The type of signal is specific to the sensitized media and could be electricity, sound, light, radio frequency, or other signal appropriate to the sensitized media. The arrangement of the strands of sensitized media in patterns can be coaxial or at any angle consistent for measurement of the path to damage conduit(s). The patterns can be touching one another if they are surface compatible such as non-metal media surface touching metal surface media.

Referring now to FIG. 2B, which shows diagrammatically a pattern of sensitized media [3] [4] [5] formed onto a surface [17] of suitable material such as a dielectric, which is placed onto the insulation protecting the core [2] and/or the conduit core [1]. The surface could be adhesive or other means such as thermal shrinking could be used as the form of attachment. Points of attachment [6] for the leads from the instrument can be positioned if desired anywhere along the said sensitized media. The pattern of sensitized media can be applied in a helical fashion as shown if omni-directional coverage is needed.

Referring now to FIG. 2C which shows diagrammatically an alternative pattern of sensitized media [3] [4] [5] laid coaxially along a surface [18]. The pattern can be repeated to encircle the insulation for omni-directional coverage. The use of co-linear sensitized media has the advantage that it can be slit to fit over the conduit. The discussion about FIG. 2A applies to this configuration as well.

Referring now to FIG. 3, which shows diagrammatically alternative embodiment number 2, with the microcontroller [13] can be separated from the apparatus yet connected to the arrangement of strands. The microcontroller [13] can be located on a conduit connected to the said conduit, serving both conduits and thereby saving costs such weight, space, and money. FIG. 3 shows a sensored conduit built with discrete sensors [19] and with a pattern of sensitized media [3] [4] [5] embedded on the inner surface of a sleeve in accordance with this invention is illustrated as applied to an insulation protecting the core [2] surrounding a conduit core [1]. The pattern of different sensitized media [3] [4] [5] are shown along the length of the insulation in side by side spirals. This embodiment provides initial protection of the plurality of sensitized media so that if ingress of damage due to stressors occurs the various materials are at risk; and as discontinuity of any sensitized media occurs the spatial location of the damage can be measured by reflectometry, signal strength remaining or other remote means. The cause of the damage can be interpreted by algorithms that take into account possible stressors and the damage inflicted to the sensitized media. A preferred embodiment shows a coupling [15] that contains the microcontroller [13] shown in the offset area inside dashed lines as well as a discrete sensor [19]. The coupling is attached to the individual members of the discrete sensor and to the sensitized media with a suitable attachment point [6]. The method of attachment can be any low impedance connection. The attachment points may be of a form such as detents, clamps, holes, posts, or screws, or in the alternative the coupling may be welded or otherwise coupled or permanently fastened to the sensitized media. The coupling itself, which may be of the so-called BNC type, have an outer shell and a center holding a plurality of conduits. The outer shell of a coupling [15] is connected to one or more of the conductive elements such as the sensitized media [4]. An attachment point [6] provides a convenient way to connect the discrete sensors [19] to the microcontroller [13] instrument and connections [7] from the test signal generators [8]. Note damage to the sensitized media [3] causing a point of damage [12]. The distance to the damage can be as short as a few millimeters and at least a few meters. The distance can possibly be as long as several miles for laser signals depending on signal loss in the fiber.

Figure 4:
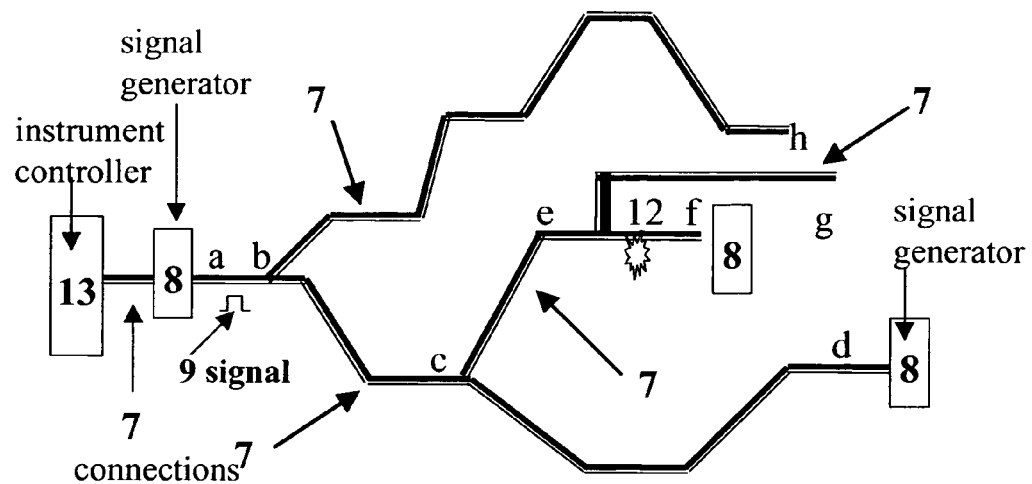
FIG. 4 is a diagrammatic view of a branched insulated conduit tree having outlying sections that when used with the invention can be automatically inspected to measure, locate and identify the cause and extent of damage in accordance with the invention.

Referring now to FIG. 4 which diagrammatically represents a tree of several connected branches of conduits. To check installation or to perform a test for absence of damage, an end-to-end test can be made using a signal of type appropriate for an element sent from a signal generator [8] and carried along connections [7] to the microcontrollers [13]. Depending on the sensory element, the signal can be of various type such as electricity, light, laser, sound, and high frequency waves. Damage [12] on section (e, f) is detected, located and its cause inferred when erosion, corrosion, breakage or other factor causes at least one sensitized media to change the response characteristic such as causing the reflection of the signal to be shorter than before with an abbreviated measured distance to the point of discontinuity caused by damage [12]. In the case of ambiguity caused by the branches, a sensor signal source can be located at another place in the tree to accurately locate the place of damage.

Figure 5:
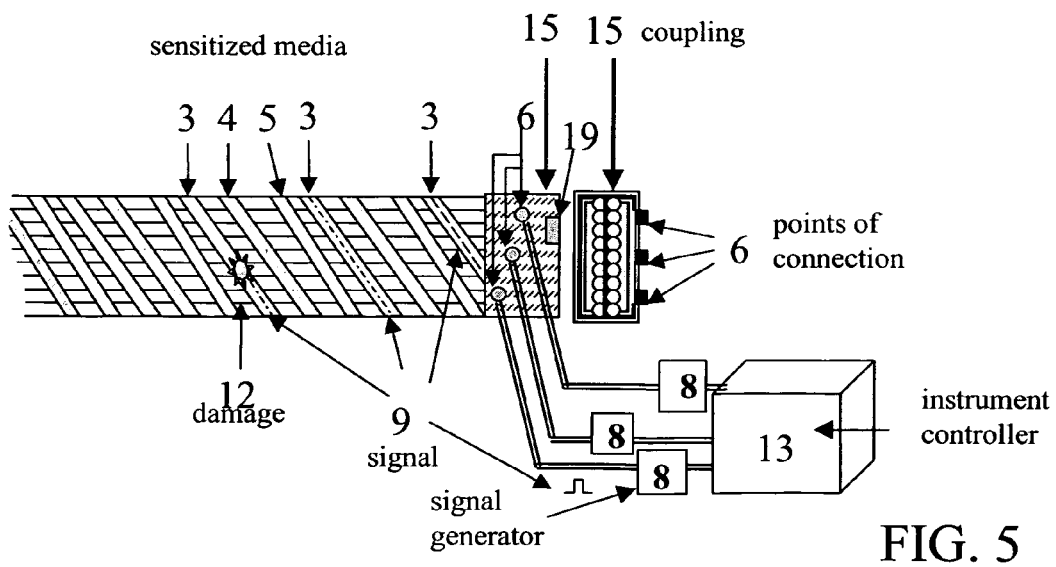
FIG. 5 is a diagrammatic view of embodiment 2 showing a flat, ribbonized, wiring harness with discrete sensors, sensitized media wound and woven in a mesh around its length terminated with a coupling containing the microcontroller, signal generators and other electronics. The figure assumes a self-contained power source or attachment of the microcontroller to a power conductor. Other comments about FIG. 1, FIG. 2, and FIG. 3 apply to this figure as well.

Referring now to FIG. 5, which shows diagrammatically embodiment 2 sensored ribbonized organized mixed electrical and fiber optic conduit built with a discrete sensor [19] and with a pattern of sensitized media [3] [4] [5] embedded on the inner surface of a sleeve in accordance with this invention is illustrated as applied to an insulation protecting the core [2] surrounding a conduit core [1]. The pattern of different sensitized media [3] [4] [5] are shown along the length of the insulation. The statements about FIG. 3 apply. Notice the shape of the coupling housing the electronics shown offset in the dashed space. These electronics could also be attached during inspection if it were not embedded in the coupling [15].

Figure 6:
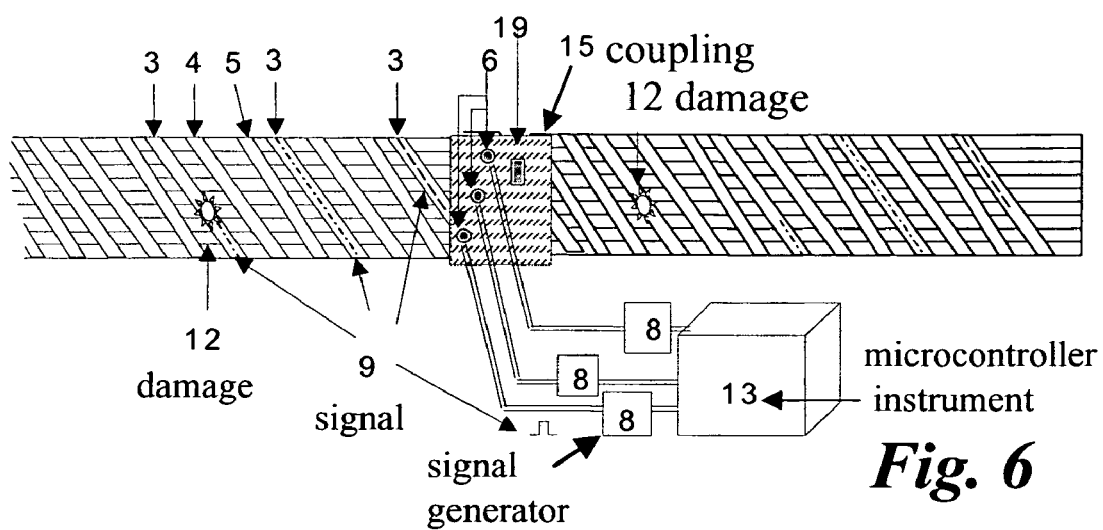
FIG. 6 is diagrammatic view of an alternative embodiment 3 similar to FIG. 5 showing one coupling serving two ribbonized strands with interwoven strands of sensitized medium. Other comments about FIG. 1, FIG. 2, FIG. 3 and FIG. 5 apply to this figure as well.

Referring now to FIG. 6, which shows diagrammatically alternative embodiment 3 similar to alternative embodiment 2 shown in FIG. 5 but with the apparatus now serving two sides, thereby achieving a saving of one microprocessor unit and ancillary electronics for the signal generator [8] and the microcontroller [13].

Figure 7:
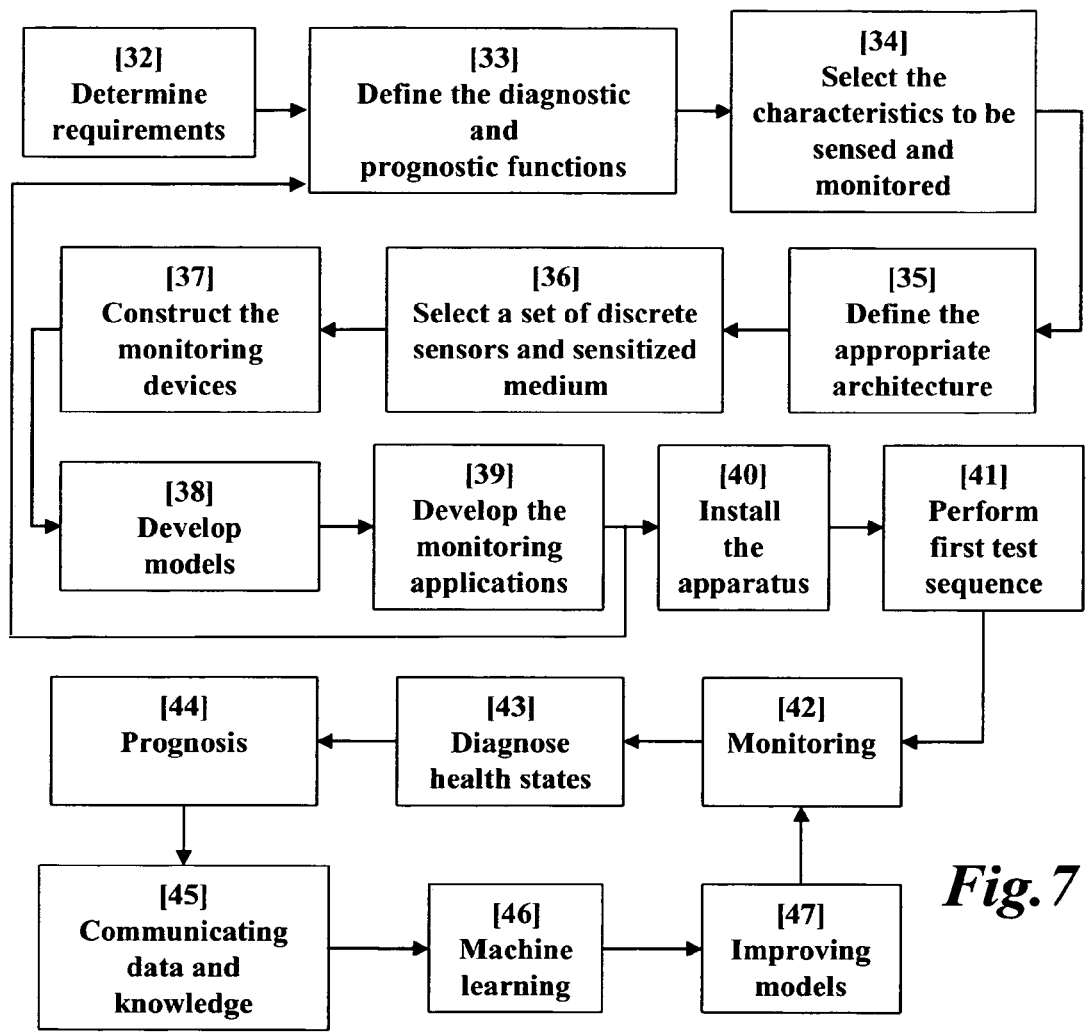
FIG. 7, FIG. 8, FIG. 9, FIG. 10, FIG. 11, FIG. 12, and FIG. 13 are a set of flow diagrams that explain the method of my patent. A person familiar with the construction of flow diagrams would know and understand that each symbol in any flowchart is a brief description of more complex underlying procedures which could encompass thousands of procedures to satisfy a certain intent. Because space available does not permit a single drawing, flow diagrams branch and are more fully described in the other diagrams. A person familiar with the construction of flow diagrams would know and understand that the arrangement of process steps indicated by the symbols can sometimes be relabeled, added, deleted, rearranged, or combined, or otherwise modified to show the level of detail desired.

Referring now to FIG. 7, which shows a flow diagram of steps, in a preferred embodiment), to define, construct, integrate, test and use the method to obtain, store and learn from data; the means to learn and fuse data to probabilistically assess causal factors of damage; the means to quantify the state of deterioration and damage that has occurred; the means to assess the risk that a situation exists that likely will soon cause deterioration or damage to happen; and the means to formulate and communicate messages about the state of deterioration, damage, risks of damage and causal factors. The flow diagram shows a series of steps starting with a procedure to determine requirements [32]; followed by steps that define the diagnostic and prognostic functions [33]; select the characteristics to be sensed and monitored [34], define the appropriate architecture [35]; define a set of discrete sensors and sensitized medium [36]; construct the monitoring devices [37]; develop models [38] that are used during monitoring; develop the monitoring applications [39] until is ready to use. When the monitoring applications are ready to use the flow diagram continues with the steps: install the monitoring apparatus [40]; perform first test sequence [41]; monitoring [42]; diagnosing health states [43]; prognosis [44]; communicating data and knowledge [45]; machine learning [46]; and improving models [47]. In a preferred embodiment, the current method incorporates algorithms that take into account factors such as operating domain and environmental factors that might affect a sensor response. Inference algorithms are those that use prior knowledge of data and/or causal relationships to infer states from data such as from a set of discrete sensors and strands made with sensitized strands. Said strands and said discrete sensors will be individually selected and sited based on the specific parameters they provide in the application and operation environment of the conduit and how damage to one or more sensitized media provides evidence for determining the cause of damage.

Figure 8:
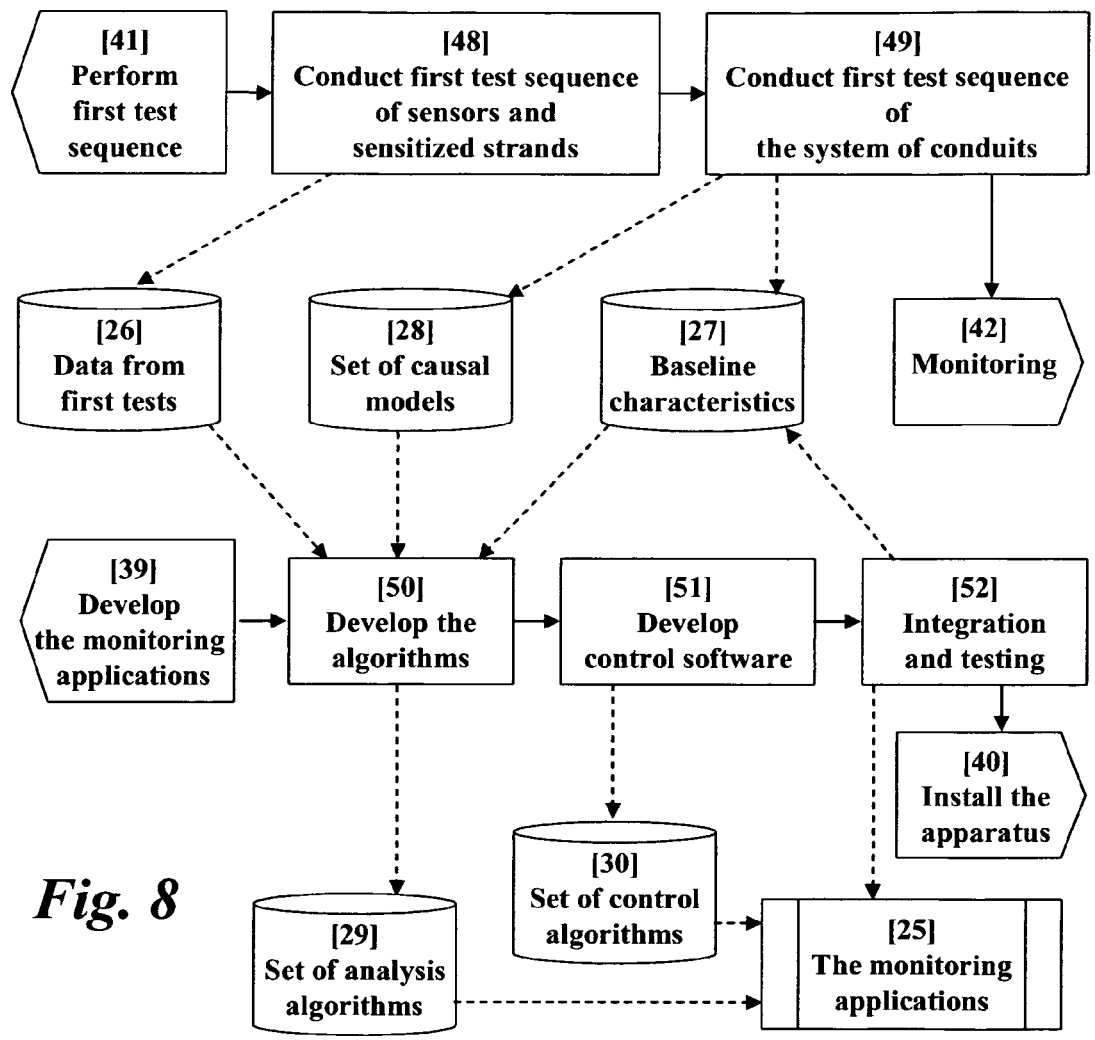

Referring now to FIG. 8, which shows a flow diagram for developing the monitoring application [39]. The process steps in FIG. 8 are: conduct first test sequence [41] of discrete sensors and sensitized strands [48] to obtain characteristic data; and conduct first test sequence of the system of conduits [49] to obtain performance, health state metrics, and stressor data in operating and non-operating domains, as well as causal relationships and other data from degraded and failed modes. The data from the first tests being used for developing the algorithms that infer and/or predict health states. The next step is to develop the algorithms [50] which in turn used to develop control software [51] that control the monitoring applications [25]; then integration and testing [52] to perfect the monitoring applications [25]. FIG. 8 includes objects representing the monitoring applications [25]; a compilation of data from first tests [26]; a set of baseline characteristics [27]; a set of causal models [28]; a set of analysis algorithms [29]; and a set of control algorithms [30]. In a preferred embodiment all the models but the conduit models would be Bayesian models because during operation of the monitoring application the models, algorithms and analysis would be Bayesian, because Bayesian calculus inherently has known error bounds which result in known error bounds for the results calculated by the application. In a preferred embodiment the cause and effect (causal) relationship models are Bayesian algorithms that probabilistically take into account possible stressors and the damage they inflict based on data from a set of discrete sensors and a pattern of sensitized media. A person familiar with computing would understand that commercially available software development tools such as MatLab™ can be used to develop the algorithms that calculate means, variances, trending, pattern matching, fuzzy logic, distance calculation, truth tables, rules, controls, data fusion, probabilistic inference and other algorithms that comprise the set of analysis algorithms [29] and application development software applications that provide convenient features for integration and testing during development of the monitoring applications.

Figure 9:
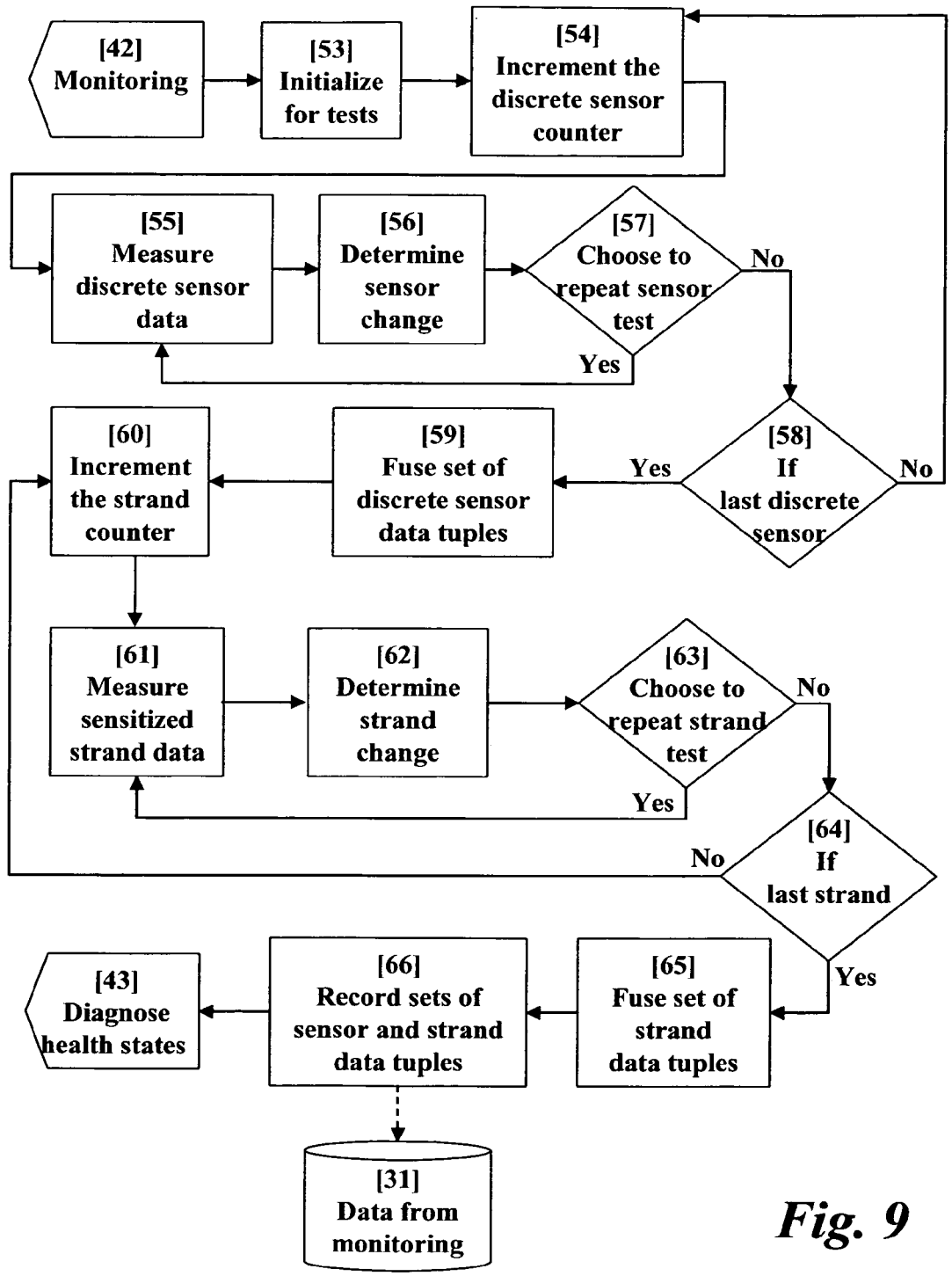

Referring now to FIG. 9, which shows a flow diagram of the process steps for monitoring [42]. The series of steps shown in FIG. 9 are: initialize for tests [53] and increment the discrete sensor counter [54]; then measure discrete sensor data [55] and determine sensor change [56]. If there is change choose to repeat test [57] to verify the change. If the decision is to not repeat the test then test for if last discrete sensor [58]; if not the last discrete sensor then go to the step increment discrete sensor counter [54] and continue testing discrete sensors until all have been tested. When all discrete sensors have been tested fuse set of discrete sensor data tuples [59]. The next sequence of steps relates to testing for change in the sensitized strands. The process of testing all strands are: increment strand counter [60] then measure sensitized strand data [61] followed by determine strand change [62]. If there is change, choose to repeat strand test [63] to verify the change. If the decision is to repeat the test then repeat the test returning to again measure sensitized strand data [61]. If the decision is not to repeat the test, return to increment strand counter [60] and continue testing until all sensitized strands have been tested by the decision if last strand [64]. When all sensitized strands have been tested then fuse set of strand data tuples [65] and record the sets of sensor and strand data tuples [66] in the set of data from monitoring [31]. Depending on the sensory element, the signal that elicits the response from the sensitized medium can be of various type such as electricity, light, laser, sound, and high frequency waves. If change or discontinuity of any sensitized media occurs, the spatial location of the damage can be measured by reflectometry, signal strength remaining or other remote means. The distance to the damage can be as short as a few millimeters and at least a few meters. The distance can possibly be as long as several miles for laser signals depending on signal loss in the fiber. The cause of the damage can be interpreted by algorithms that take into account possible stressors and the damage inflicted to the sensitized media.

Figure 10:
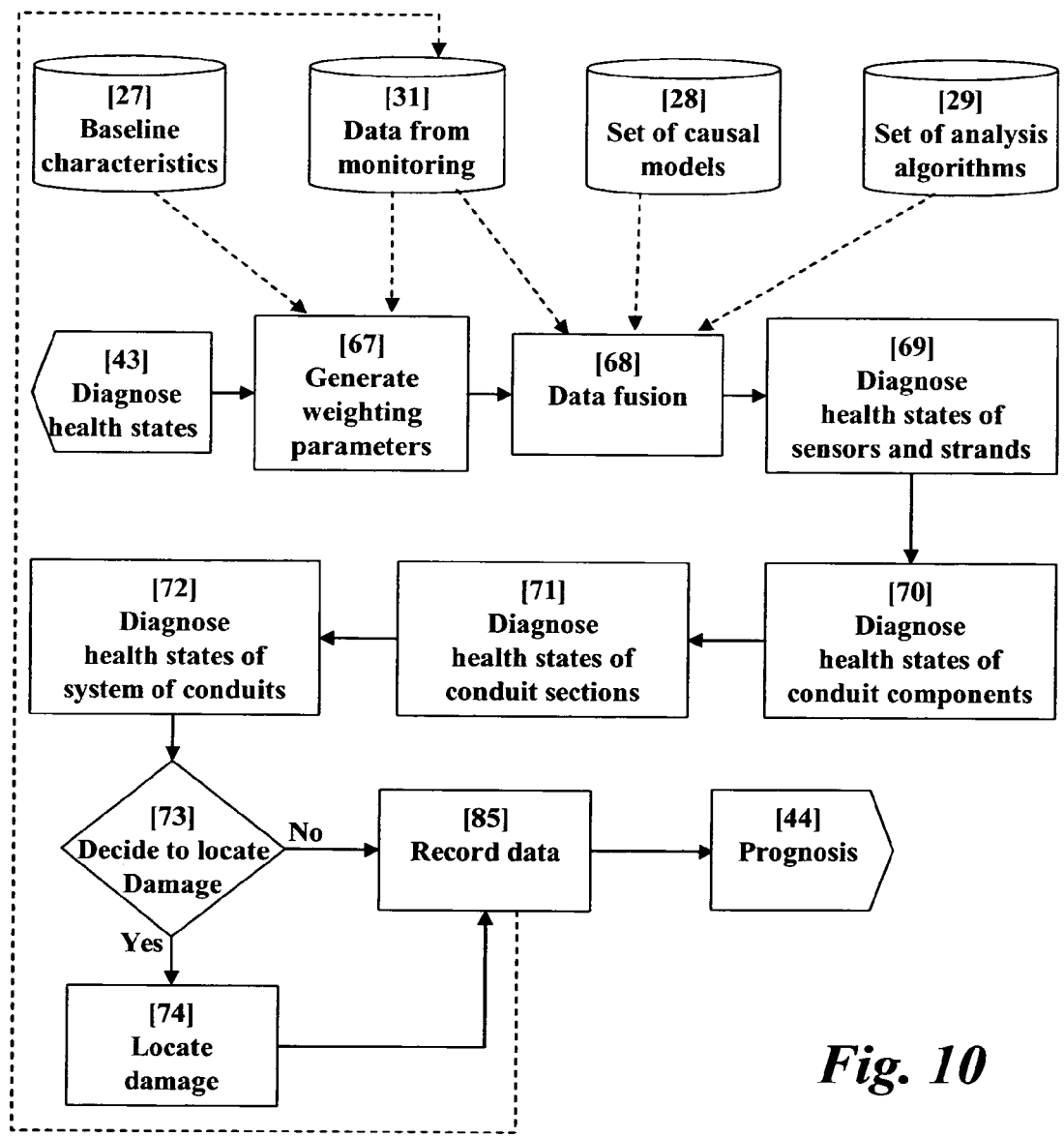

Referring now to FIG. 10 which shows a flow diagram of the steps for diagnosing health states [43]. The first step is to use data from baseline characteristics [27] and data from monitoring [31] to generate weighting parameters [67] that are used to adjust data for temperature and other environmental effects on the accuracy of data values of data from monitoring [31] with the set of causal models [28] and the set of analysis algorithms [29] used in data fusion [68] used combine evidence to diagnose health states of sensors and strands [69]; to diagnose health states of conduit components [70]; to diagnose health states of conduit sections [71], to diagnose health states of system of conduits [72]; to decide to locate damage [73] and if decision is to locate, then perform a measurement algorithm to locate damage [74]. In either case, follow by a process to record data [85] in the set of data from monitoring [31]. My method uses combining data with data fusion using logic, causal relationships and inference algorithms because, in the case of systems of conduits, some states cannot be observed with a discrete sensor and must be inferred with an inference algorithm based on causal relationships and fusion of data from several discrete sensors and sensitized strands sited near, on, in and along the system of conduits. Data fusion used with logic, as used in truth tables and rules, causal relationships and inference algorithms are means for locating the place of damage and reasoning the probable cause of damage from data. Depending on the sensory element, the signal can be of various type such as electricity, light, laser, sound, and high frequency waves. Damage on a section of conduit is detected, located and its cause inferred when erosion, corrosion, breakage or other factor causes at least one sensitized media to change a response characteristic such as causing the reflection of the signal to be shorter than before with an abbreviated measured distance to the point of discontinuity caused by damage. In the case of ambiguity caused by the branches, data from a discrete sensors, a sensor signal source, or data from sensitized strands located at another branch in the tree provide data for an inference algorithm to locate the place of damage.

Figure 11:
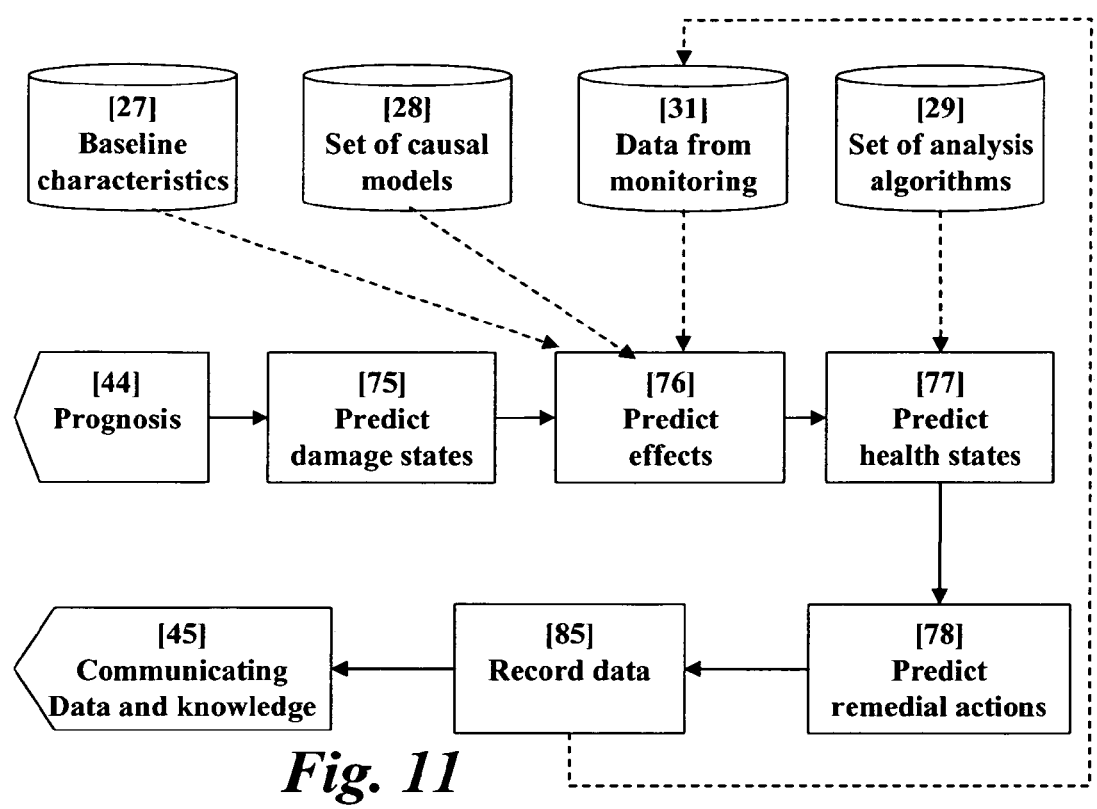

Referring now to FIG. 11, which shows a flow diagram showing the steps for prognosis [44] which, on detection of damage, uses algorithms such as trending, pattern matching, fuzzy logic, distance calculation, logic, inference and data fusion predicts future damage states, effects and remedial actions based on impact of damage. The steps shown are: predict damage states [75], predict effects [76] processing characteristics selected from the set of baseline characteristics [27] and data selected from the set of data from monitoring [31] with models from the set of causal models [28], using the results thereof to predict health states [77] using the set of analysis algorithms, and use a Bayesian network or other model to predict remedial actions [78] and then record data [85] in the set of data from monitoring [31]. The current invention uses the causal relationships that were initially determined in first tests and improved with learning over time as a means to predict future local, system and end effects of faults and failures as well as remedial actions.

Figure 12:
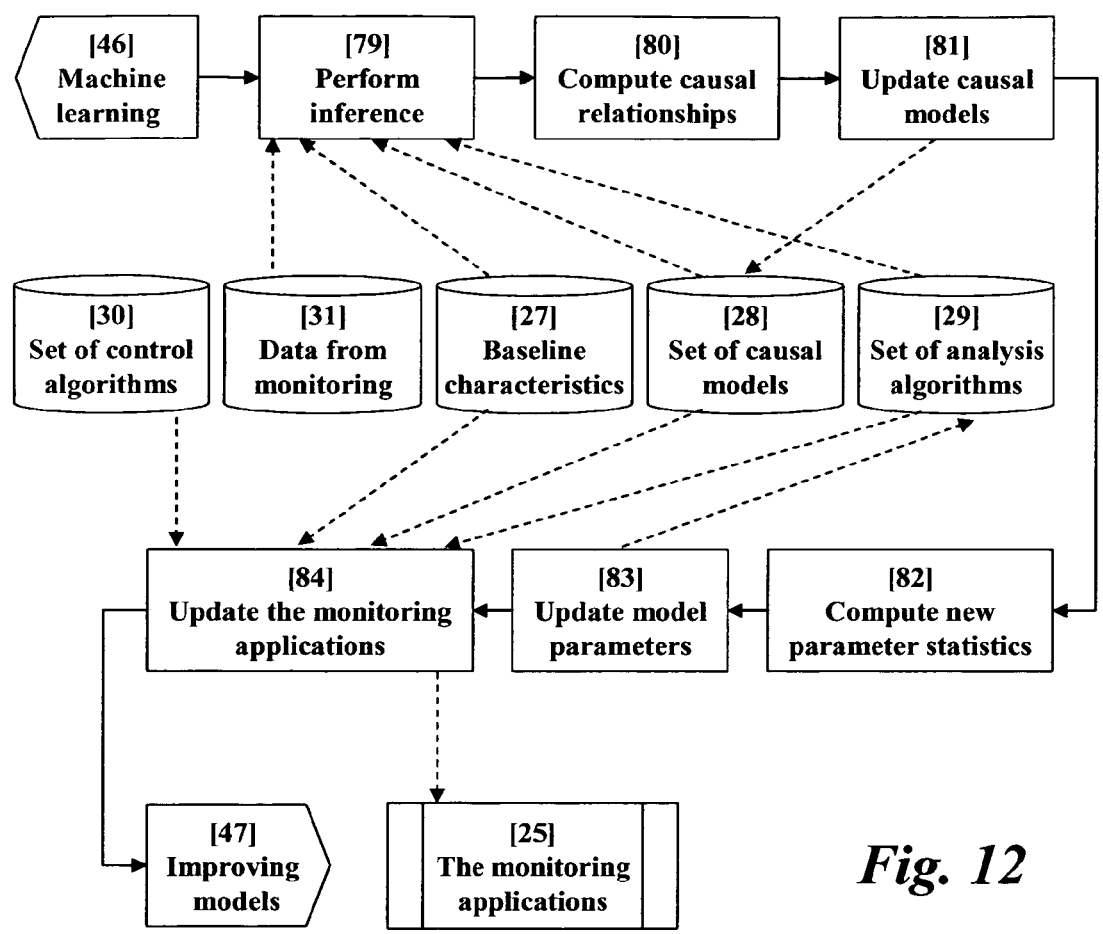

Referring now to FIG. 12, which shows a flow diagram showing the steps for machine learning [46] to improve the accuracy of the inference algorithms, analytical models and causal models [47]. As shown in FIG. 12, the steps for machine learning are: using data from monitoring [31], baseline characteristics [27], and analysis algorithms [29]; perform inference [79] with Boolean logic or a Bayesian algorithm using data from the set of data from monitoring [31], characteristics from the set of baseline characteristics [27], causal models from the set of causal models [28] and analysis algorithms selected from the set of analysis algorithms [29]. The next step is to compute causal relationships [80] based on the inference and thence update causal models [81] replacing previous causal models in the file causal models [28]; then use parameter estimating algorithms to compute new parameter statistics [82]; and update model parameters [83]. The last step shown in FIG. 12 is to revise the monitoring applications [25] by performing the step of update the monitoring applications [84] with the data from the set of control algorithms [30], baseline characteristics [27], the set of causal models [28] and the set of analysis algorithms [29]. A person familiar with the art of automated learning would realize that machine learning algorithms are widely available in books on artificial intelligence and professional papers on artificial intelligence. The machine learning process acts to improve the models by using machine learning algorithms to compute new parameters, models, relationships and characteristics based on actual values of data from monitoring [31] by using statistical analyses and probabilistic reasoning to improve and update the logic, inference algorithms, causal relationships and other analysis components that improve the monitoring applications. A person familiar with artificial intelligence methods would realize that there are teaching and examples of statistical methods for learning algorithms in numerous publicly available text books and papers on statistical methods on artificial intelligence.

Figure 13:
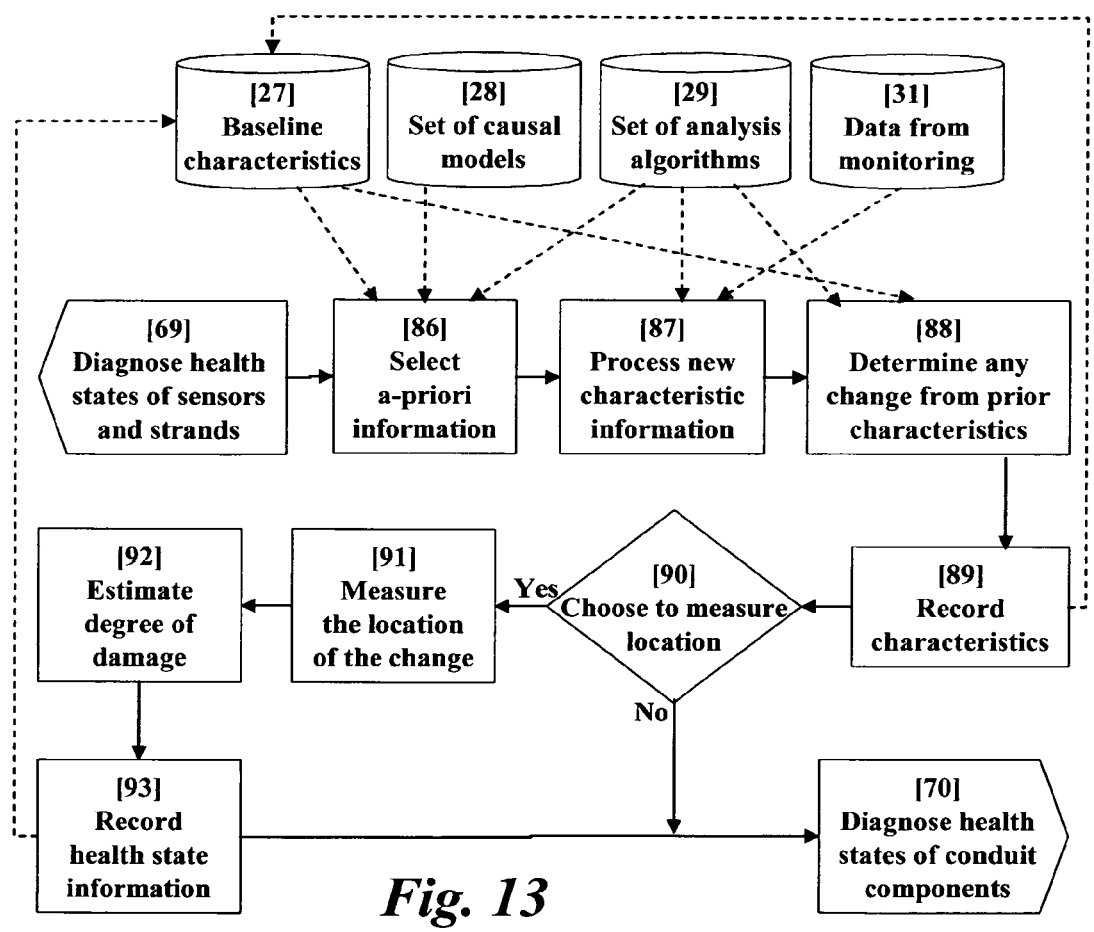

Referring now to FIG. 13 which shows a flow diagram of the steps of diagnosing health states of sensors and strands [69] by using a deductive algorithm, select a-priori information [86] from data sources such as baseline characteristics [27] and the set of causal models [28] (if any) with algorithms selected from the set of analysis algorithms [29]; then process new characteristic information [87] using algorithms selected from the set of analysis algorithms [29] to produce results which are used to determine any changes from prior characteristics based on the recent data from the set of data from monitoring [31] to determine any change from prior characteristics [88] utilizing algorithms selected from the set of analysis algorithms [29]; then record characteristics [89] by placing the results in the set of baseline characteristics [27]; and based on any change make a decision to choose to measure location [90]; if the choice is to measure the location then perform a measurement algorithm to measure the location of the change [91], using either a direct calculation based on the response to the applied signal or apply a measuring technique such as reflectometry on a waveform conducting medium; and using inference or a calculus estimate degree of damage [92] at each point of damage; and record health state information [93] by placing the results in the set of baseline characteristics [27].

Other embodiments can utilize a manual readout device such as a commercially available personal computer or palm computer. Testing by automated readout can be instrumented in any of several implementations depending on the particular applications by interfacing with the microcontroller [13] by way of its input/output connectors.

A person familiar with the art of sensing and using algorithms would know that estimating the speed and depth of damage can be accomplished by an inference algorithm that incorporates spatial parameters of the system of conduits and spatial parameters that describe where the set of discrete sensors and the sensitized strands are located, such as placement of sensitized strands atop one another so that when each in turn is damaged the depth of damage is determined. Cross-talk caused by separated adjacent conduits will not generally be a problem because measurements will usually be performed serially. Non-interfering patterns of discrete sensors and sensitized strands, such as one for voltage and one for light waves can be laid touching side by side to avoid even a tiny gap that might lead to having an undetected point of damage. Conflicting conducting patterns such as gold and aluminum which both conduct electricity will need spatial clearance or a suitable spacing material to avoid forming junctions, cross-talk or other confounding situations. The pattern of conducting elements can be applied singularly or en masse as an applique embossed on a non-conducting substrate such as polyimide or a fluoropolymer such as EFTE. Or, the pattern of conducting elements can be extruded or embossed directly onto the insulation surface. Whatever the type of pattern (helical, coaxial, wavy, etc.) that is used, all distances to a point of damage are also defined.

A person familiar with using sensors and sensoring methods for locating sites of damage in a branched tree of conduits would understand that in any embodiment, one or more additional couplings [15] with or without microcontroller [13] and discrete sensors [19] can be attached to the pattern of sensitized media at locations spaced apart from the first coupling [15], so that differential measurements can be taken at the couplings. The additional information from such measurements at another point of the branches will accurately resolve any ambiguities caused by a plurality of sensitized media in a branched tree of conduits.

A person familiar with sensoring would understand that in the case of very long conduits perhaps over 1000 meters, it may be necessary to add additional processors at distanced points, probably at connectors as determined by the range of effectiveness of individual sensors.

While the current invention is described mostly in connection with a presently preferred embodiment thereof, those skilled in the art will recognize that any modifications and changes may be made therein without departing from the true spirit and scope of the invention, which accordingly is intended to be defined solely by the appended claims. For instance, in most figures three distinct sensor elements are shown, but there could be any number arranged in any order. Any person familiar with performing tests for conductivity and reflectometry will concur that any number of sensitized media laid in patterns of any non-interfering arrangement can be utilized.

All of the embodiments above offer the following advantages over present techniques. The present invention detects many damages other than chafing caused by many other causes than abrasion or incision. It matters not whether the conduit is operating or not operating. The present invention detects damage due to virtually all and every stressor by selecting sensitized strands specific to each damaging factors of each stressor. The present invention can be implemented to operate from manual to fully automatic.

Clearly, many modifications and variations of the present invention are possible in light of the above teachings. Which embodiment to employ depends on the application. The choice should be left to system engineers and experts in operating the systems to be protected. It should be therefore understood that, within the scope of the inventive concept, the invention may be practiced otherwise than as specifically claimed.

OPERATION

Preferred Embodiment

Operation of the invention is accomplished by selecting and procuring or making the sensitized sensor medium appropriate to the environment, damage causing factors, and the conduit; assembling the largely parallel arrangement of said strands onto the support media; adding the points and connections to the electronics (if any), adding appropriate sensors (if any); and authoring algorithms and rules for running in the microcontroller (if any); installing the apparatus onto or into the conduit; performing tests for operability; install the apparatus onto or into the conduit; activate with a suitable power source (if any).

When forming the sensor medium onto the support medium it is prudent to encircle the segments of the conduit with a tightly spaced helix of sensitized media joined as necessary by couplings that accomplish continuity. In the preferred embodiment, depending on the sensitized media it may be necessary to attach a lead from a measurement instrument and a lead from a signal source to opposite ends of said sensitized media for the purpose of collecting and interpreting changes in data caused by stressors.

The sensor medium should be in contact with the surface of the conduit. If a heat shrinkable substrate is used, the embodiment is heated appropriately to tightly affix the embodiment to the segments of the interconnection assembly. In operation the sensitized media encasing the segments will be affected by stressors operating on them. End to end tests or tests such as reflectometry can be used to detect damage to any sensitized media able to carry the waveforms. On detection of said damage the computer uses algorithms such as trending, pattern matching, fuzzy logic, distance calculation, logic, inference and data fusion to determine the type, location and cause of the damage as well predict future impacts of the damage if damage is allowed to progress into the protective insulation and eventually the conducting core. Next, the results of the detection, location, and determination of cause are used to initiate or request actions that mitigate or remove the stressor or stressors that are the cause of damage as well as corrective actions to bypass, repair or otherwise deal with the damage. During said actions the damage to the interconnection system is repaired and damaged and sections of the sensitized media used in the embodiment of the invention are replaced or repaired.

The current patent is a distributed system for monitoring a health status and integrity of at least one conduit, the system comprising a plurality of local health status and integrity monitoring devices each capable of inspecting the status of local individual conduits and conduit components, each local monitoring device coupled to a central processor by wired or wireless means, the central processor for receiving from each local monitoring device the local data concerning its associated conduits, for generating a set of data for each local conduit monitoring device, and for communicating the set of data to each local conduit monitoring device; and each local monitoring device having a local processor for receiving the set of data, collecting data regarding the at least one local conduit and analyzing the local data using a set of data for local health monitoring purposes.

In a preferred embodiment there is at least one monitoring device for monitoring at least one conduit with at least one conductor for diagnostic purposes, the monitoring device comprising: at least one processor for the purpose of acquiring sensor information from a set of sensors and sensitized medium, processing the sensor information based on parameters and environmental condition of the conduit, and for processing the information to provide an output signal indicative of the condition and an estimate of remaining useful life of the conduit and conductors it monitors, and means associated with the at least one programmed microcontroller or other processor for operating the device in a monitoring mode, after the at least one programmed microcontroller or other processor has operated in the birth certificate mode, wherein the at least one programmed microcontroller or other processor acquires, conditions, and processes the data from the said set of sensors and sensitized strands, compares the processed data to previously stored data, and provides an indication of the condition of the conduit based on the comparisons.

In a preferred embodiment there is a set of sensors that are sheets, strips or strands of at least one sensitized medium, said sensors so constructed that end-to-end said sensors are essentially opaque to electrical signal transmission; and said sensors being positioned with respect to the conduit to provide information concerning the environment and real or potential damage and deterioration to the conduit; and said sensors producing at least one optical phenomena when stimulated by a mechanism that causes the said optical phenomena; and said sensitized mediums selected from mediums that are capable of supporting or conducting an electrical current and voltage, electromagnetic signals, optical signals, audio signal, shock waves, and liquids with the purpose to provide a means for controls and stimuli to the said sensitized medium, and measures of parameters of said sensitized mediums include: (i) means; (ii) variances; (iii) range; (iv) and the overall characteristics of the strand.

In a preferred embodiment the said set of sensors includes a strand that incorporates a mechanism as a means to mark location of damage such as fluorescent debris.

In a preferred embodiment the said monitoring device includes at least one temperature sensor.

In a preferred embodiment the said set of sensors includes at least one vibration sensitized medium.

In a preferred embodiment the said set of sensors includes at least one electromagnetic interference (EMI) sensitized medium.

In a preferred embodiment the said set of sensors includes at least one temperature sensitized medium.

In a preferred embodiment the said set of sensors includes at least one strand of corrosivity sensitized medium.

In a preferred embodiment the said set of sensors includes at least one strand of chafing sensitized medium.

In a preferred embodiment the said set of sensors includes at least one strand of pressure sensitized medium.

In a preferred embodiment the said set of sensors includes at least one strand of chemically sensitized medium.

In a preferred embodiment the said set of sensors includes at least one strand of piezoelectric sensitized medium.

In a preferred embodiment the set of sensors includes at least one strand of base metal coated medium.

In a preferred embodiment the said set of sensors includes at least one strand of noble metal coated medium.

In a preferred embodiment the said set of sensors includes at least one strand of clad silica sensitized medium.

In a preferred embodiment the said set of sensors includes at least one strand of fluorescent doped sensitized medium.

In a preferred embodiment the monitoring device is further comprised of a communication link, and a communication control circuit coupled to the programmed processor and to the communication link, the communication control circuit being adapted to communicate information and data over the communication link.

In a preferred embodiment the monitoring device is further comprised of a visual indicator for providing a visual indication of the condition of the conduit; and coupled to the centralized data processor of claim 1 for purposes of sending the output signal generated by the processor of said monitoring device.

In a preferred embodiment the said set of sensors provide a means for coupling to a plurality of conductors and connectors at spaced apart locations along the branches; and a terminator connected to a first connector; and a means to attach appropriate signals; and a means to attach a signal analysis instrument.

In a preferred embodiment the sensors of the said set of sensors comprise a means to quantitatively measure changes in signals and secondary effects as a means to detect the presence, degree, and location of deterioration or damage.

In a preferred embodiment the sensitized media of the said set of sensors are made up of diverse sensitized media including hollow, filled or solid strands, fibers and strips made with combinations of inorganic, organic or man-made materials.

In a preferred embodiment the sensitized media of the said set of sensors comprises at least one dielectric.

In a preferred embodiment the sensitized media of the said set of sensors is in coaxial relationship with linear, curvilinear, or helical format.

In a preferred embodiment the sensitized media of at least one sensor of the said set of sensors is fabricated on an inner layer.

In a preferred embodiment the sensitized media of at least one sensor of the said set of sensors is fabricated on an outer surface.

In a preferred embodiment the sensitized media of at least one sensor of the said set of sensors conducts electricity.

In a preferred embodiment the sensitized media of at least one sensor of the said set of sensors conducts light.

In a preferred embodiment the sensitized media of a at least one sensor of the said set of sensors conducts electromagnetic-signals.

In a preferred embodiment the sensitized media of at least one sensor of the said set of sensors conducts acoustic signals.

In a preferred embodiment the sensitized media of sensor of at least one sensor of the said set of sensors acts as a waveguide.

In a preferred embodiment the sensitized media of at least one sensor of the set of sensors acts as a transmission line.

In a preferred embodiment the sensitized media of at least one sensor of the said set of sensors when joined by a multiplicity of interfaces creates a plurality of sections.

In a preferred embodiment the conduit monitored by the said monitoring device is comprised of one or more non-insulated conducting strands.

In a preferred embodiment the conduit monitored by the said monitoring device is comprised of one or more insulated conducting strands.

In a preferred embodiment the conduit monitored by the said monitoring device is joined by a multiplicity of couplings to create a plurality of sections.

In one embodiment the conduit monitored by the said monitoring device is comprised of a liquid material.

In one embodiment the conduit monitored by the said monitoring device is comprised of ceramic material.

In one embodiment the conduit monitored by the said monitoring device is comprised of metal material.

In one embodiment the conduit monitored by the said monitoring device is comprised of plastic material.

In one embodiment the conduit monitored by the said monitoring device is comprised of glass material.

In one embodiment the conduit monitored by the said monitoring device is comprised of a concretion.

In a preferred embodiment a method is provided for assessing a health status of conduits, the determining comprising: determining requirements for monitoring the system of conduits; selecting parameters to be sensed and monitored; selecting components consisting of electronics, hardware, software, firmware and set of discrete sensors and strips of sensitized medium to implement said functions; designing and manufacturing a form and fit of the monitoring device comprised of said components; applying, placing, attaching or embedding the monitoring device and sensors consisting of at least one strand of said sensitized medium along the length of a conduit, wherein said strands of sensitized medium has a first end and a second end, said strands of sensitized medium being placed such that damage inducing factors such as a solid object, gas, liquid, powder or electromagnetic waves contact said sensitized medium prior to contacting a conduit; determining by a combination of measurement by signal processing and deductive algorithms whether, when, where and to what extent said damage inducing factors have damaged each of said multiplicity of sensitized medium. Use of the current invention comprises the steps of: using said monitoring apparatus to periodically monitor at least a portion of the said system of sensors at given points in time over a first extended period and, for each point in time, storing in a digital memory a data couplet containing information concerning said parameters, and the point in time; and using analog circuits to condition, sample, hold, and digitize the signals from the said sensors into parameter values; and forming tuplets that represent the time of the sample, identity of the sensor, and said parameter values; and using digital processor algorithms to identify tuplets having normal values within a predetermined range; and providing an indication of steady state characteristics if said parameter values for at least a predetermined number of tuples are within a first predetermined range; and providing a programmed diagnostic algorithm for assessing risk of damage to the sensor and extent of deterioration and damage to the monitored conduits; and providing an algorithm for estimating remaining useful life of the monitored conduits and components; and providing a protocol for communicating about sensed damage, deterioration, and as well as diagnostic information concerning a health status and integrity of the monitored conduits, components and system; and performing a first test sequence on each of the multiplicity of said sensitized medium for the purpose of forming a baseline of characteristic parameters of each said sensitized medium for future reference by measuring the characteristic parameters and storing characteristic parameters in accessible storage medium or location for future use; from time to time performing the same said first test sequence on each of the multiplicity sensitized medium; making a test measurement for the purpose of determining if said measured characteristic parameters are substantially equal to previously measured characteristic parameters. The possible outcomes being: there is no measurable change to the sensitized portion of the medium; and there is measurable change to the sensitized portion of the medium; and the medium is disrupted, broken, eroded, cut through or dissolved; and choosing whether to repeat said step of test measurement of said sensitized medium; and if the choice is to repeat, then repeating said steps of measuring and determining; and with the digital processor, using a deductive algorithm along with any a priori probability information to: process data from said measuring of said multiplicity of sensitized medium into characteristic information; and determine any change of said-characteristic parameters from recorded-characteristic parameters; and record the parameters for later use; and choose whether to measure to locate the change; and if the choice is to locate then measure using either direct calculation based on response to the applied signal; or apply a measuring technique; and record the measured value and temporal information if available; and using a calculus estimate the degree of damage for each said sensitized media at each recorded point of damage, for each time if temporal information is recorded.

Reduction to Practice

In the course of reducing the invention to practice we acquired and used several commercially solid and hollow coated fiber technologies. We acquired fibers from Polymicro Technologies, Fiberguide Industries, and Lucent Technologies. There are literally hundreds of different commercial fiber products, each with different properties. According to a preferred embodiment of the present patent, we formed a substrate of a commercially available polyimide film. To the said substrate we attached and glued fibers that were of approximately equal diameter in a largely parallel repeated and measurable alignment. The said fibers were a fiber surface-coated with a piezoelectric substance, an aluminum coated fiber, a gold coated fiber, and a silica optical fiber coated with polyimide. We selected the piezoelectric coated fiber for its ability to generate electrical signals during abrasion to indicate evidence rubbing. We selected the fiber coated with aluminum for the purpose to sense and locate damage of corrosion. We selected the fiber gold plated fiber as a control to differentiate chemical corrosion of aluminum from chafing and cut-through laceration. We selected a silica core optical fiber coated with polyimide insulation as a control.

Next, the film with the attached fibers was wrapped to surround the surface of a conduit consisting of several insulated electrical wires. We recorded the geometry variables for use in accurately measuring the distance from the end to a point of damage.

In a parallel effort, we loaded commercially available software into the remote computer. We used the Matlab™ software to process sampled data and test Boolean equations and Netica™ software for making probabilistic estimates using a probabilistic calculus called a Bayesian Belief Network. Next, we connected each fiber surface to the digitizing input of the microcontroller circuit and obtained and recorded characteristic measurements.

We conducted experiments using seeded damage. The experiments were successful in detecting seeded damage. The experiments consisted of salt water for slow corrosion, rubbing with and without fine pumice to simulate erosion causing chafing, knife cuts causing lacerations, and direct flame causing quick oxidation of aluminum and melting of plastics. Sensor data collected by the microcontroller was transmitted to the remote computer. Digitized waveforms from reflectometry were processed with a MatLab™ Time Domain Reflectometer simulator program. When a fiber filled with ink was breached the ink leaked out showing the ability to mark the point of damage. We used the Bayesian Belief Network to determine the most probable cause of damage from sensed data.

We performed tests with a commercially available encapsulated marking substance to mark points of damage caused by lacerations, erosion, corrosion, burning, arcing, and dissolution. A person familiar with the art of using liquid filled fibers would recognize that when breached by a stressor the liquid filed fiber will leak fluid when a pressure differential occurs and that said pressure differentials are especially common in traversing altitudes of aircraft flight regimes.

CONCLUSION, RAMIFICATIONS, AND SCOPE

The information in this patent disclosure discloses the idea, embodiment, operation of the invention in order to support the stated claims. The scope of the claims includes variants of the use of inference algorithms, logic and other mathematical and statistical methods in conjunction with processors processing data from a set of discrete sensors and patterns of diverse and different sensitized media formed, laminated, extruded, glued, taped, on or in materials such as insulation and materials used to construct various types of conduits. The various types of conduits include, but are not limited to, harnesses and cables of electrical and fiber optic systems as well as conduits comprised of pipes and hoses carrying liquids, gases and solids.

A person familiar in aircraft systems would understand that in the case of aircraft conduits it is reasonable that minimal selection of strands would include those to sense laceration, corrosion, heat and chafing. Individual hollow strands coated with aluminum to detect corrosion, a material with a positive thermal coefficient to detect heat, and piezoelectric material to detect mechanical chafing would suffice.

A person familiar in the art of forming insulated strands will concur that the said pattern of sensitized media can be extruded on the surface of the insulation or extruded as a layer in the insulation protecting the conduit.

A person familiar in sensing would appreciate and understand that the discrete sensors and the strands of sensitized medium may not be necessary in some alternate embodiments.

A person familiar in the art of sensitized medium and their arrangement would appreciate that they can be substituted freely with equivalent components to adapt to specific application requirements.

A person familiar in developing algorithms for sensing would appreciate and understand that some steps shown in FIG. 7 through FIG. 13 may not be necessary in some alternate embodiments.

A person familiar in the art of developing computer programs would appreciate that the algorithms can be substituted freely with equivalent components to adapt to specific application requirements.

A person familiar in the art of using microcontrollers would appreciate and agree that various commercial equivalent microcontroller products or even a unique design using discrete components can be substituted freely to adapt to specific application requirements.

A person familiar in the art of chemistry would understand that the marking substances can also be formulated to provide a functionality at extreme temperatures as well a self healing mechanisms to control damage, or prophylactic properties to prevent further damage. Said person would agree that marking substances can be formulated to provide visual reference, such as fluorescing under ultra-violet light, or provide other attributes for detection such as radioactivity, smell, or coloration at the place of damage using means such as instruments, humans, or animals trained to detect the released substance. The said person would agree that the said marking substance can be formulated to provide ability to work at extreme temperatures, have low capillary adhesion, to be eroded by chafing to be a marker powder, and other desired attributes for use in applications.

A person familiar with design and use of sensors would agree that it matters not whether any fiber is used for multiple purposes such as detecting movement and vibration because such uses are not conflicting. The said person would agree that fibers can be selected to collect evidence of causal factors associated with application specific environments.

A person familiar in the art of building sensors would understand that the attachment point [6] may be unnecessary as direct coupling may be possible. Also, a person familiar in the art would recognize that the surface and shape of the apparatus can be rectangular, round, or any shape as required by the shape of the conduit.

A person familiar in the art would understand that for use of a reflectometer a built in signal decoupler would enable determining is which direction the damage occurred. A person familiar in the art would understand that various shapes of the pattern of signal conduits such as parallel wavy lines are equivalent.

A person familiar in making insulated conduits would understand that the pattern of conducting elements can be embedded or embossed on a non-conducting substrate such as mylar or polyimide. Or, the pattern of conducting elements can be extruded or embossed directly onto the inner insulation surface and then overcoated with insulation material. Several embedded layers can be combined with a surface layer if desired.

A person familiar in the art of sensors would understand that if an electrically conductive sensitized media was used as a sensor, a load resistor or capacitor to a segment of the applique conduit for performing measurements to determine and localize a discontinuity or change in impedance between the two connectors. The couplings [15] could self contain a multiplicity of miniature lasers such as a vertical cavity semiconductor lasers and detection by a light detector perhaps implemented with a directional coupler along with a microcomputer. Similar configurations would use radio frequencies, microwaves, or spectral energy with appropriate detectors.

A person familiar in the art of sensors would understand that mixed sensitized media can be used and formulated for specific sensory properties such as electrically conductive, optically conductive, chemically sensitive, etc. and that sensitized surfaces can be of diverse properties such as inert, piezoresistive, piezoelectric, semiconductor, chemically soluble, chemically reactive, etc.

A person familiar in the art of optical materials such as glass or plastic fibers would understand that mixed sensitized media can be used such as optically conductive sensitized media, and that a photo-diode, photo-resistor or photo-capacitor could be used with an selected wavelength photo-emitters to determine and localize a discontinuity or change in optical impedance in the distance of the conduit.

A person familiar in signal measurement would agree that while it is possible to make measurements on a terminated and active insulated conduit, it is also possible to make measurements on an un-terminated insulated conduit. Said person would also understand that no signal is added or taken from the conduit, which is insulated. However, the accuracy of measurement is greatest when the distance between the measuring instrument (e.g. a reflectometer) is small and the terminating impedance is lowest. It will also be understood measurements can be made over more than one segment of a conduit with reduced accuracy. This is consistent with the use of reflectometry in testing of multiple segments of conduits in long distance communication systems and long distance electrical lines.

A person familiar in the art of sensors and sensing would agree that shape of the strands of sensing material can be circular like that of fibers or any manufacturable shape including but not limited to square, trapezoidal, parallelograms, and oval.

A person familiar in the art of sensors and sensing would agree that the width of the conducting material may not be as important as for electrical signals; and may be quite independent of width of the conducting material for optical and fluorescent fibers especially when evanescent escape is minimal. Further, a person familiar in the art would understand that a decoupler would enable determining is which direction the damage occurred.

A person familiar in the art of sensors would agree that a pattern of discrete sensors and strands of sensitized media can touch if touching is not a source of confounding information such as caused by a metal to metal short or interference in a light path.

A person familiar in the art of sensors would agree that a plurality of heterogeneous sensitized media in diverse shapes can be used including but not limited to filaments, ribbons, strips, or deposits and extrusions.

A person familiar in the art of sensors would agree that the types of sensitized media can be homogeneous or heterogeneous, can be made from differing yet compatible materials, and that a selection of heterogeneous materials (e.g. gold and aluminum) allows use of pattern recognition and logical inference.

A person familiar in the art of sensors would agree that damage to the sensitized media that causes significant change in impedance or discontinuity, causes the reflected characteristics to be changed shortened and that the location of the point of damage is calculated by measuring the distance from the source of the pulse as a function of known frequency and known time of the return pulse by using a signal processing algorithm similar in function to a Fast Fourier Transform. If the distance can be in one of several directions a decoupler can be used to limit the pass through of the waveform to a single direction.

A person familiar in the art of sensors would agree that the foreshortening of a fiber doped with a fluorescing material would reduce lumens contained and reflected to the source.

A person familiar in the art of florescent illumination of doped fibers would agree that the foreshortening of a fiber doped with a fluorescing material would reduce lumens reflected to the source. The location of the point of damage is accomplished by measuring the amount of lumens sensed at the source. If the distance can be in one of several directions a one-way optical grating can be used to limit the pass through of the lumens to a single direction.

A person familiar in the art of damage prevention would understand that the preferred configuration will result in damage detection before any damage failure of the inner insulation protecting the core.

I claim:

1. A distributed system for monitoring a health status and integrity of at least one conduit, the system comprising:

a plurality of local health status and integrity monitoring devices each capable of inspecting the status of local individual conduits and conduit components, each local monitoring device coupled to a central processor by wired or wireless means, the central processor for receiving from each local monitoring device the local data concerning its associated conduits, for generating a set of data for each local conduit monitoring device, and for communicating the set of data to each local conduit monitoring device; and each local monitoring device having a local processor for receiving the set of data, collecting data regarding the at least one local conduit and analyzing the local data using the set of data for local health monitoring purposes; and a set of sensors having outputs coupled to the conduit monitoring device, at least one sensor being an environmental sensor for providing environmental information indicative of the local environmental condition, and sensors that are strips or strands of heterogeneous sensitized medium; said medium essentially opaque to a signal being transmitted through the set of local conduits selected from the group of mediums that are capable of supporting or conducting an electrical current and voltage, an electromagnetic signal, an optical signal, an audio signal, and an indicating substance with the purpose to provide sensor information indicative of damage to the sensitized medium; with each sensor or strand of sensitized medium being positioned with respect to the conduit to provide information concerning the environment and damage and deterioration to the conduit; and at least one of the monitoring devices for use in monitoring at least one conduit with at least one conductor for diagnostic purposes, the monitoring device comprising: at least one programmed microcontroller or other programmed processor for the purpose of acquiring the sensor information from a set of sensors and sensitized medium, conditioning and normalizing the sensor information based on parameters and environmental condition of the conduit, and processing the normalized information to provide an output signal indicative of the diagnostic condition and the prognostic estimate of remaining useful life of the conduit(s) and conductor(s) it monitors.

* * * * *